(12) United States Patent
Scholl

(10) Patent No.: US 12,509,234 B2
(45) Date of Patent: Dec. 30, 2025

(54) PROPULSION SYSTEM ARCHITECTURE

(71) Applicant: Boom Technology, Inc., Centennial, CO (US)

(72) Inventor: Nathaniel Blake Scholl, Englewood, CO (US)

(73) Assignee: Boom Technology, Inc., Centennial, CO (US)

( * ) Notice: Subject to any disclaimer, the term of this patent is extended or adjusted under 35 U.S.C. 154(b) by 0 days.

(21) Appl. No.: 18/493,186

(22) Filed: Oct. 24, 2023

(65) Prior Publication Data

US 2024/0132221 A1 Apr. 25, 2024
US 2024/0228048 A9 Jul. 11, 2024

Related U.S. Application Data

(60) Provisional application No. 63/380,891, filed on Oct. 25, 2022.

(51) Int. Cl.
| | |
|---|---|
| *B64D 27/16* | (2006.01) |
| *B64C 15/14* | (2006.01) |
| *B64C 30/00* | (2006.01) |
| *F02C 7/32* | (2006.01) |
| *F02K 3/04* | (2006.01) |

(52) U.S. Cl.
CPC .............. *B64D 27/16* (2013.01); *B64C 15/14* (2013.01); *B64C 30/00* (2013.01); *F02C 7/32* (2013.01); *F02K 3/04* (2013.01)

(58) Field of Classification Search
CPC ......... B64D 27/16; B64C 15/14; B64C 30/00; F02C 7/32; F02K 3/04; F02K 3/06; F02K 3/062
See application file for complete search history.

(56) References Cited

U.S. PATENT DOCUMENTS

| | | | | |
|---|---|---|---|---|
| 2006/0054739 A1* | 3/2006 | Perez | ........................ | F02K 3/04 244/55 |
| 2018/0273193 A1* | 9/2018 | Summers | ................... | F02K 9/08 |
| 2018/0362171 A1* | 12/2018 | Curchod | .............. | B64D 27/402 |
| 2019/0234242 A1* | 8/2019 | Ramakrishnan | ........ | B64C 30/00 |
| 2021/0323685 A1* | 10/2021 | Kupratis | ................... | F02C 7/36 |

* cited by examiner

*Primary Examiner* — Rodney A Bonnette
(74) *Attorney, Agent, or Firm* — Brake Hughes Bellermann LLP

(57) ABSTRACT

An aircraft propulsion system having a variable airflow capture area is provided. The propulsion system includes a main propulsion source and an auxiliary propulsion source. In a first mode, the auxiliary propulsion source is stowed within an aerodynamic profile of the aircraft, and the main propulsion source provides all of the propulsion force for powering flight of the aircraft. In a second mode, the auxiliary propulsion source is deployed to augment the airflow capture area of the main propulsion source and increase an overall airflow capture area of the propulsion system. In the second mode, the auxiliary power source is operated by power extracted from the main propulsion source. The main propulsion source may include one or more low bypass ratio engines. The auxiliary power source may include one or more auxiliary thrust fans coupled at a plurality of locations on the aircraft.

36 Claims, 28 Drawing Sheets

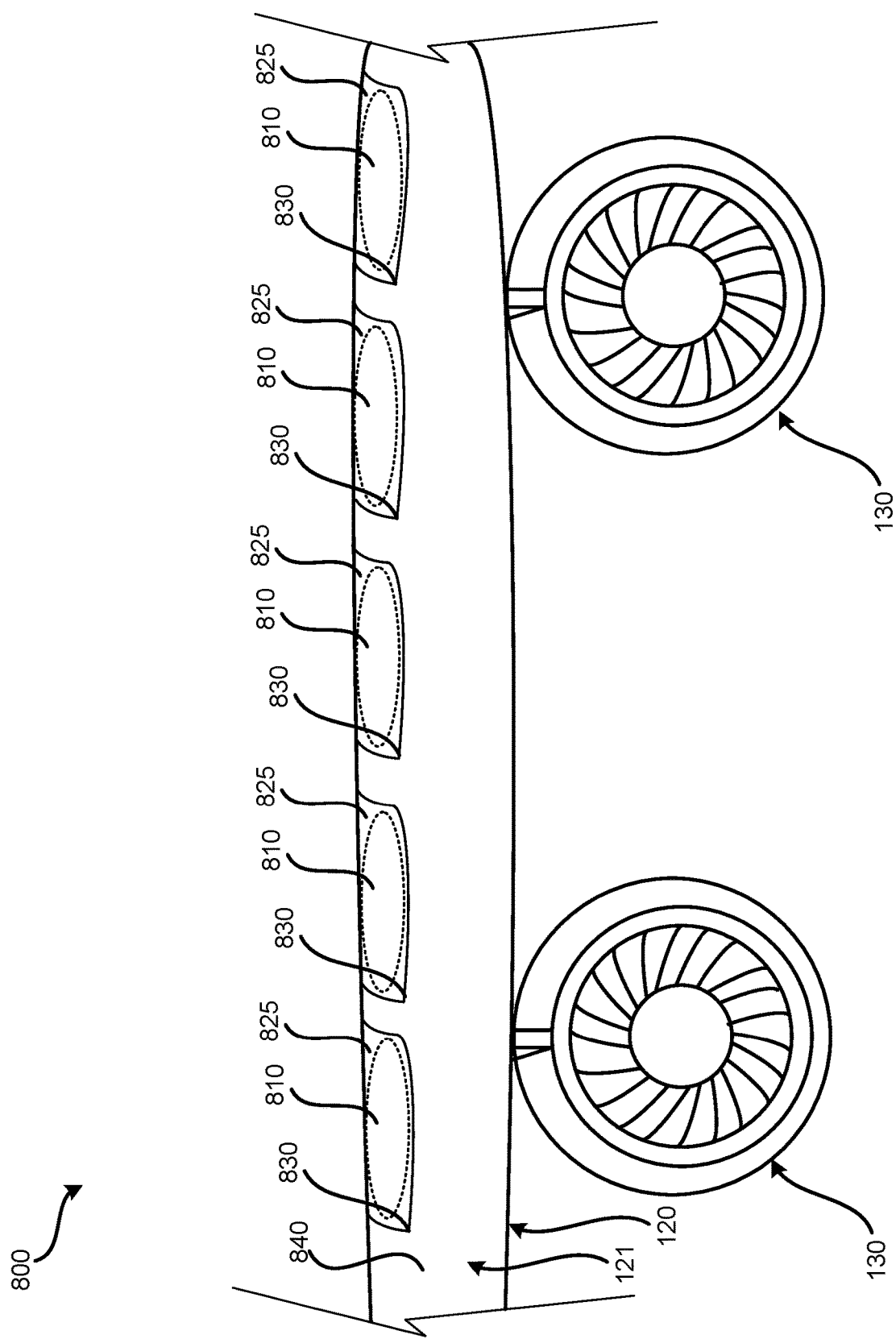

PROPULSION SYSTEM ARCHITECTURE

CROSS-REFERENCE TO RELATED APPLICATIONS

This application claims priority to U.S. Provisional Application No. 63/380,891, filed on Oct. 25, 2022, entitled "PROPULSION SYSTEM ARCHITECTURE," the disclosure of which is incorporated herein in its entirety.

TECHNICAL FIELD

This relates, in general, to aircraft propulsion systems, and in particular, to an architecture for propulsion systems for supersonic passenger aircraft that incorporate propulsion-based noise reduction features.

BACKGROUND

Passenger aircraft may achieve high speed flight, for example, supersonic flight, through the incorporation of one or more turbojet engines into an aircraft body designed to withstand such speeds, while also maintaining passenger safety and comfort. Often, such aircraft make use of one or more engines, for example, turbojet engines, having a relatively low bypass ratio. These relatively low bypass ratio engines may provide for efficiency at cruise speeds, for example, supersonic cruise speeds, particularly given the relatively long range flights for which these types of passenger aircraft are likely to be operated. However, noise output by operation of these relatively low bypass ratio engines at lower speeds, for example, take-off and/or landing speeds and the like, may exceed acceptable noise levels and/or established noise standards for operation of passenger aircraft in a commercial environment.

SUMMARY

Systems and methods, in accordance with implementations described herein, include a propulsion system for a passenger aircraft that operates in a first mode to provide for high speed cruise operation of the passenger aircraft, for example, supersonic cruise speeds, and in a second mode to provide for operation of the passenger aircraft at lower speeds such as, for example, take-off and/or landing speeds. In some examples, the propulsion system includes a variable airflow capture area that provides for operation in the first mode and in the second mode. In some examples, the propulsion system includes a main propulsion source that provides for operation in the first mode, and an auxiliary propulsion source that provides for operation in the second mode. In some examples, the auxiliary propulsion source operates together with the main propulsion source to provide for variable airflow capture area. In some examples, the main propulsion source provides for operation of the auxiliary propulsion source in the second mode.

In some examples, the main propulsion source includes one or more turbojet engines, for example, one or more relatively low bypass ratio turbojet engines. In some examples, the auxiliary power source includes one or more auxiliary thrust fans that are mechanically driven by the main power source in the second mode. In some examples, the auxiliary power source includes one or more auxiliary thrust fans that are electrically driven by the main power source in the second mode. Operation of the one or more auxiliary thrust fans, driven by the main power source in the second mode, may augment, or increase, a propulsive airflow capture area during operation in the second mode, in which the aircraft is operated at relatively lower speeds. The augmented, or increased, airflow capture area provided by the auxiliary power source in the second mode, during operation of the aircraft at lower speeds, may reduce an overall noise level output by the aircraft during operation at these lower speeds. In some examples, the auxiliary power source may be deployed for operation in the second mode, for example, positioned in the airflow direction of the aircraft. In some examples, the auxiliary power source (i.e., the one or more thrust fans) may be in a standby state during operation in the first mode, for example, stowed within the aerodynamic profile of the aircraft. The stowing of the auxiliary power source in the first mode may allow the main propulsion source (for example, the one or more low bypass ratio turbojet engines) to provide for high speed cruise of the passenger aircraft.

The ability to deploy the auxiliary power source during low speed operation, and to stow the auxiliary power source, within the aerodynamic profile of the aircraft, during high speed cruise operation of the aircraft, may allow high speed cruise propulsion to be provided by one or more relatively low bypass ratio turbojet engine(s), to provide for efficiency during high speed (i.e., supersonic) cruise operation, while augmenting or increasing airflow capture area during lower speed operation, thus mimicking a higher bypass ratio engine during lower speed operation. This may provide for reduced overall noise levels output by the propulsion system during operation of the aircraft at lower speeds, while preserving efficiency during operation at higher cruise speeds. In some examples, this may provide for efficient operation of a passenger aircraft using relatively low bypass ratio engine(s), within established noise standards for operation of passenger aircraft in a commercial aviation environment.

In some aspects, the techniques described herein relate to an aircraft, including: an aircraft structure; a propulsion system operably coupled in the aircraft structure, the propulsion system having a variable airflow capture area, the propulsion system including: at least one jet engine mounted to the aircraft structure; at least one auxiliary thrust fan coupled in the aircraft structure, wherein in a first mode, the propulsion system has a first airflow capture area, the at least one jet engine provides power to the aircraft, and the at least one auxiliary thrust fan is in a standby state, stowed within an aerodynamic profile of the aircraft structure; and in a second mode, the propulsion system has a second airflow capture area that is greater than the first airflow capture area, and the at least one auxiliary thrust fan is in a deployed state and is driven by power extracted from the at least one jet engine.

In some aspects, the techniques described herein relate to an aircraft, wherein the first mode corresponds to a supersonic operation mode of the aircraft; and the second mode corresponds to a low speed operation mode of the aircraft.

In some aspects, the techniques described herein relate to an aircraft, wherein an exhaust velocity of the at least one jet engine in the second mode is less than the exhaust velocity of the at least one jet engine in the first mode as power is extracted from the at least one jet engine to drive the at least one auxiliary thrust fan; and a noise level output by the at least one jet engine in the second mode is less that the noise level output by the at least one jet engine in the first mode.

In some aspects, the techniques described herein relate to an aircraft, wherein the at least one auxiliary thrust fan is mechanically coupled to and driven by the at least one jet engine in the second mode.

In some aspects, the techniques described herein relate to an aircraft, wherein the at least one auxiliary thrust fan is electrically coupled to and driven by the at least one jet engine in the second mode.

In some aspects, the techniques described herein relate to an aircraft, wherein the at least one jet engine includes at least one low bypass ratio turbojet engine configured to generate thrust to support supersonic cruise operation of the aircraft; and the at least one auxiliary thrust fan includes a plurality of auxiliary thrust fans.

In some aspects, the techniques described herein relate to an aircraft, wherein the first airflow capture area is defined by a capture area of the at least one low bypass ratio turbojet engine; and the second airflow capture area is defined by an airflow capture area of the plurality of auxiliary thrust fans together with the capture area of the at least one low bypass ratio turbojet engine.

In some aspects, the techniques described herein relate to an aircraft, wherein the at least one auxiliary thrust fan includes a plurality of auxiliary thrust fans arranged circumferentially along an aft end portion of a main body of the aircraft structure.

In some aspects, the techniques described herein relate to an aircraft, wherein the at least one auxiliary thrust fan includes a plurality of auxiliary thrust fans arranged circumferentially along a forward end portion of a main body of the aircraft structure.

In some aspects, the techniques described herein relate to an aircraft, wherein the at least one auxiliary thrust fan includes a first plurality of auxiliary thrust fans arranged along a leading edge portion of a first wing of the aircraft structure, and a second plurality of auxiliary thrust fans arranged along a leading edge portion of a second wing of the aircraft structure.

In some aspects, the techniques described herein relate to an aircraft, further including a drive system coupled between the at least one jet engine and the at least one auxiliary thrust fan, the drive system including: a generating system operably coupled to the at least one jet engine, wherein the generating system is configured to generate electric power from power extracted during operation of the at least one jet engine; and a distribution system configured to selectively distribute the electric power generated by the generating system to the at least one auxiliary thrust fan to drive the at least one auxiliary thrust fan during operation in the second mode.

In some aspects, the techniques described herein relate to an aircraft, wherein the drive system includes a power storage device configured to store electric power generated by the generating system.

In some aspects, the techniques described herein relate to an aircraft, wherein the distribution system is configured to distribute electric power stored in the power storage device to a plurality of systems of the aircraft.

In some aspects, the techniques described herein relate to a propulsion system, including: a main propulsion system including a main propulsion source; and an auxiliary propulsion system that is selectively driven by the main propulsion system, the auxiliary propulsion system including an auxiliary propulsion source, wherein, in a first mode of operation: the main propulsion source is configured to output a first amount of thrust, and the auxiliary propulsion source is in an idle state; and in a second mode of operation: the main propulsion source is configured to output a second amount of thrust that is less than the first amount of thrust, and the auxiliary propulsion source is in a deployed state and is driven by power extracted from the main propulsion source.

In some aspects, the techniques described herein relate to a propulsion system, wherein the first mode is a high speed mode of operation, and the second mode is a low speed mode of operation.

In some aspects, the techniques described herein relate to a propulsion system, further including a drive system coupled between the main propulsion system and the auxiliary propulsion system, the drive system including: a generating system operably coupled to the main propulsion source and configured to extract power from the main propulsion source during operation of the main propulsion source; and a distribution system configured to distribute electric power, generated by the generating system, to the auxiliary propulsion source to drive the auxiliary propulsion source during operation in the second mode.

In some aspects, the techniques described herein relate to a propulsion system, wherein the propulsion system is configured for incorporation into a supersonic aircraft, and wherein the main propulsion source includes a plurality of high bypass ratio engines configured to be mounted on the supersonic aircraft, and the auxiliary propulsion source includes a plurality of auxiliary thrust fans configured to be mounted at a corresponding plurality of locations on the supersonic aircraft.

In some aspects, the techniques described herein relate to a propulsion system, wherein, in the first mode, the plurality of high bypass ratio engines are configured to provide thrust for high speed operation of the supersonic aircraft; and in the second mode, at least some of the plurality of high bypass ratio engines are configured to provide power to drive the plurality of auxiliary thrust fans for low speed operation of the supersonic aircraft.

In some aspects, the techniques described herein relate to an aircraft, including: a main body; a wing structure mounted at an intermediate portion of the main body; a plurality of control devices provided at an aft end portion of the main body; a propulsion system operably coupled to the aircraft, the propulsion system including: a plurality of jet engines mounted on at least one of the wing structure or the main body; and a plurality of auxiliary thrust fans coupled to the main body and configured to be independently controlled to provide for directional control of the aircraft.

In some aspects, the techniques described herein relate to an aircraft, wherein an operating speed of the plurality of auxiliary thrust fans is independently adjustable, such that a variation in operating speed of the plurality of auxiliary thrust fans generates a thrust differential to provide for directional control of the aircraft.

In some aspects, the techniques described herein relate to an aircraft, wherein an orientation of the plurality of auxiliary thrust fans is independently adjustable, such that a variation in orientation of the plurality of auxiliary thrust fans generates a thrust differential to provide for directional control of the aircraft.

In some aspects, the techniques described herein relate to an aircraft, wherein the plurality of auxiliary thrust fans are circumferentially arranged along the aft end portion of the main body, proximate the plurality of control devices.

In some aspects, the techniques described herein relate to an aircraft, wherein a variation in at least one of an operating speed or an orientation of one or more auxiliary thrust fans, of the plurality of auxiliary thrust fans, on a first lateral side of the main body generates a thrust differential with remaining auxiliary thrust fans, of the plurality of auxiliary thrust fans, on a second lateral side of the main body, that adjusts a yaw component of the aircraft.

In some aspects, the techniques described herein relate to an aircraft, wherein a variation in at least one of an operating speed or an orientation of one or more auxiliary thrust fans, of the plurality of auxiliary thrust fans, on an upper portion of the main body generates a thrust differential with remaining auxiliary thrust fans, of the plurality of auxiliary thrust fans, on a lower portion of the main body, that adjusts a pitching component of the aircraft.

In some aspects, the techniques described herein relate to an aircraft, wherein the plurality of auxiliary thrust fans are circumferentially arranged along a forward end portion of the main body, proximate a nose portion of the aircraft.

In some aspects, the techniques described herein relate to an aircraft, wherein the plurality of auxiliary thrust fans are arranged along a leading edge portion of the wing structure.

In some aspects, the techniques described herein relate to an aircraft, wherein at least some of the plurality of auxiliary thrust fans are gimbal mounted.

In some aspects, the techniques described herein relate to an aircraft, wherein the plurality of auxiliary thrust fans are driven in response to power extracted from at least one of the plurality of jet engines.

In some aspects, the techniques described herein relate to an aircraft, wherein the plurality of auxiliary thrust fans are driven in response to electrical power generated by a generating system from the power extracted from the at least one of the plurality of jet engines.

In some aspects, the techniques described herein relate to a drive system for a propulsion system, including: a generating system coupled to a main propulsion source including a jet engine, wherein the generating system is configured to generate electric power from power extracted during operation of the jet engine; a distribution system coupled to the generating system, wherein the distribution system is configured to distribute electric power generated by the generating system to auxiliary systems connected to the distribution system; and a power storage device connected to the generating system and to the distribution system and configured to store electric power generated by the generating system for distribution by the distribution system.

In some aspects, the techniques described herein relate to a drive system, wherein the distribution system is configured to distribute electric power to an auxiliary propulsion source including one or more auxiliary thrust fans.

In some aspects, the techniques described herein relate to a drive system, wherein the auxiliary systems include operational systems of an aircraft in which the jet engine is installed.

In some aspects, the techniques described herein relate to a drive system, wherein the generating system is configured to operate to generate electric power from power extracted during low speed operation of the jet engine.

In some aspects, the techniques described herein relate to a drive system, wherein the generating system is configured to operate to generate electric power from power extracted during high speed operation of the jet engine, and to store the electric power in the power storage device.

BRIEF DESCRIPTION OF THE DRAWINGS

FIG. 8A is a partial front view of an example wing of an example aircraft, illustrating a stowed state of an example plurality of auxiliary thrust fans of an example auxiliary propulsion system, in accordance with implementations described herein.

Figure 1A:
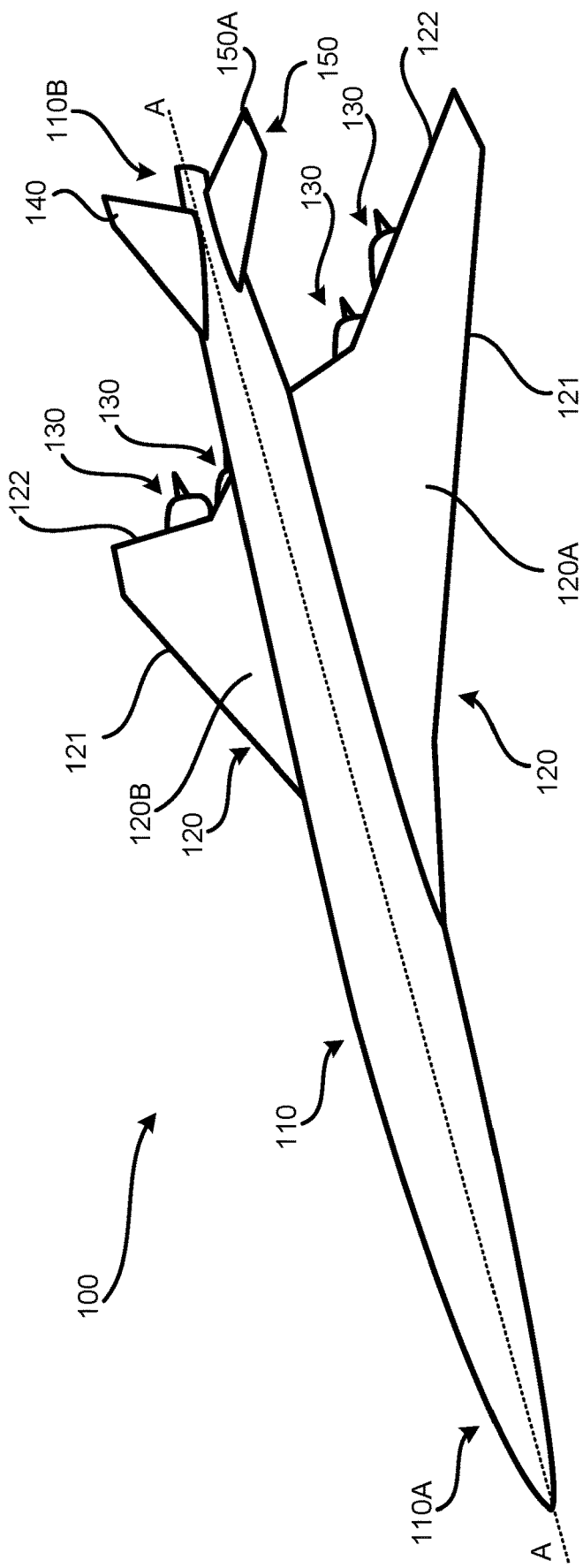
FIG. 1A is a front perspective view of an example aircraft.

The above figures are provided to illustrate features and concepts to be described herein, and are not necessarily drawn to scale.

DETAILED DESCRIPTION

Efficiency at high speed cruise conditions, for example, supersonic flight conditions, particularly over relatively long ranges, is typically achieved through the use of relatively low bypass ratio jet engines, for example, turbojet engines. The use of relatively low bypass ratio jet engines allows for a relatively large portion of the airflow captured by the jet engine(s) to be processed through the core of the jet engine(s) for the production of thrust. While the incorporation of high bypass ratio jet engines into a supersonic aircraft may provide for efficiency at high speed/supersonic cruise conditions, noise levels generated by the high bypass ratio jet engines at low speed conditions, such as take-off and/or landing, may be relatively high. In some situations, the noise generated by these types of high bypass ratio jet engines at low speed conditions may exceed established noise standards for operation of passenger aircraft in a commercial aviation environment.

In some situations, the issue of noise generated during low speed operation may be at least partially addressed through the use of higher bypass ratio engines. Typically, increases in the bypass ratio of an engine, that can still produce the thrust required during high speed/supersonic cruise, relies on the use of a larger (in some cases, considerably larger) fan, to increase airflow capture area. The higher bypass ratio engine relies on the greater airflow capture area to capture a larger mass flow (compared to the lower bypass ratio engine), and accelerate that larger mass flow to a lesser degree (compared to the lower bypass ratio engine) through the core of the engine to produce the same amount of thrust (as the lower bypass ratio engine) at a reduced noise level (compared to the lower bypass ratio engine). While the use of a higher bypass ratio engine may be effective in reducing noise levels produced for a given amount of thrust during low speed operation, the larger diameter fan (and nacelle) associated with the higher bypass ratio engine increases cross-sectional area of the aircraft. The increases in cross-sectional area of the aircraft have a negative impact on drag, particularly in areas associated with engine installation where the aircraft may be most sensitive to changes in cross-sectional area. Increased drag, in turn, has a negative impact on efficiency, particularly during high speed/supersonic cruise, which is exacerbated over long range flights. Additionally, increases in fan diameter associated with the higher bypass ratio engine drive increases (for example, multiplicative increases) in inlet length, thus increasing wetted area and further negatively impacting drag. Further, increases in fan diameter (and corresponding increases in overall engine diameter) in turn drive increases in landing gear height and weight, to provide necessary ground clearance, particularly during take-off when the aircraft rotation angle could otherwise cause interference between the nacelle and the runway.

Thus, there are considerable trade-offs to be made in the design and operation of supersonic aircraft, and particularly the design and operation of supersonic passenger aircraft to be operated in a commercial aviation environment, between noise generated during low speed operation (i.e., at take-off and/or landing), and efficiency during high speed/supersonic operation of the aircraft, particularly over relatively long ranges. Systems and methods, in accordance with implementations described herein, provide a propulsion system having a variable mass flow capture area, providing a supersonic aircraft with increased mass flow capture area for use during low speed operation to reduce noise, but that retains efficiency associated with the standard mass flow capture area during high speed/supersonic cruise operation.

Figure 1B:
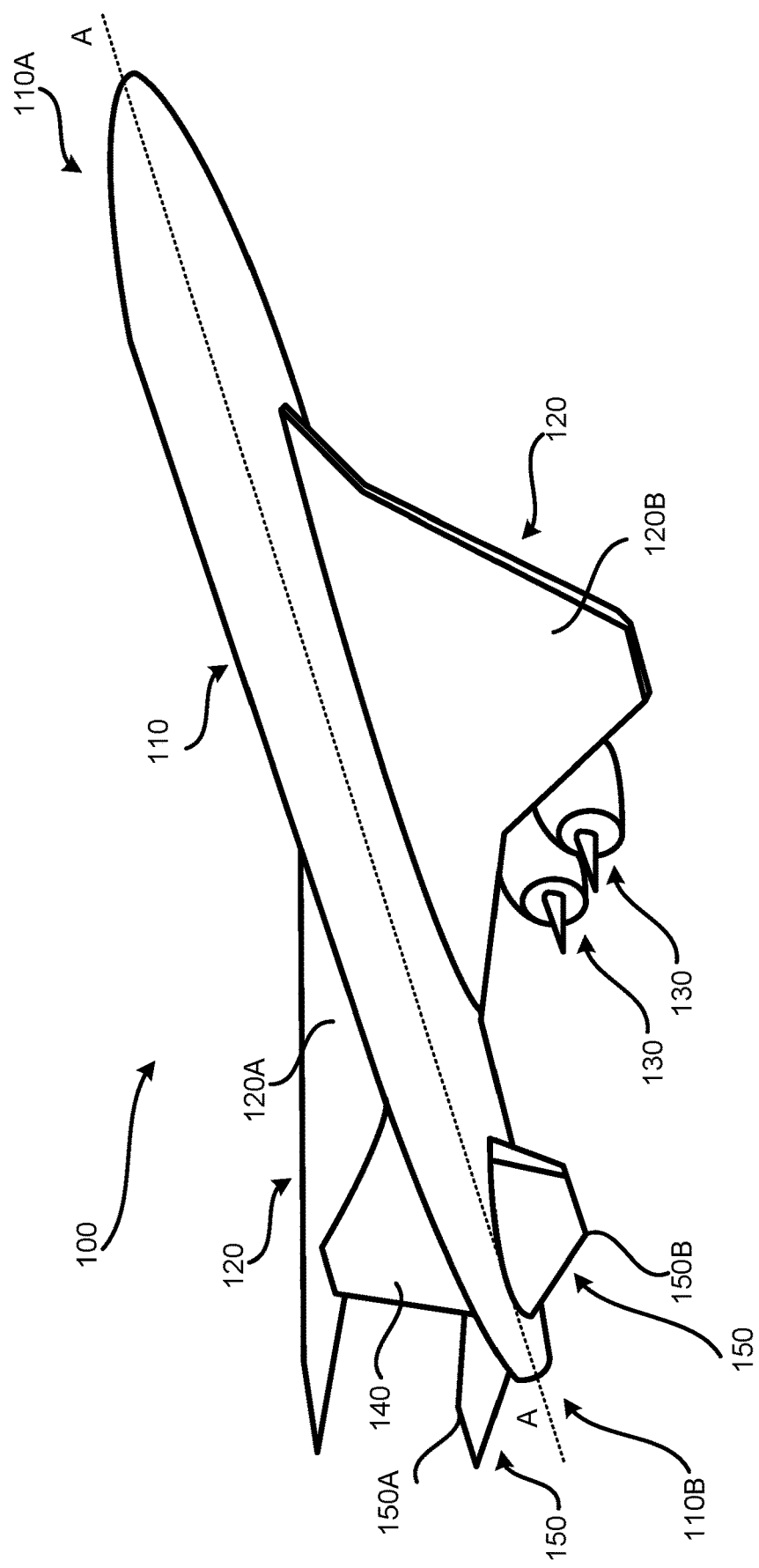
FIG. 1B is a rear perspective view of the example aircraft shown in FIG. 1A.
Figure 1C:
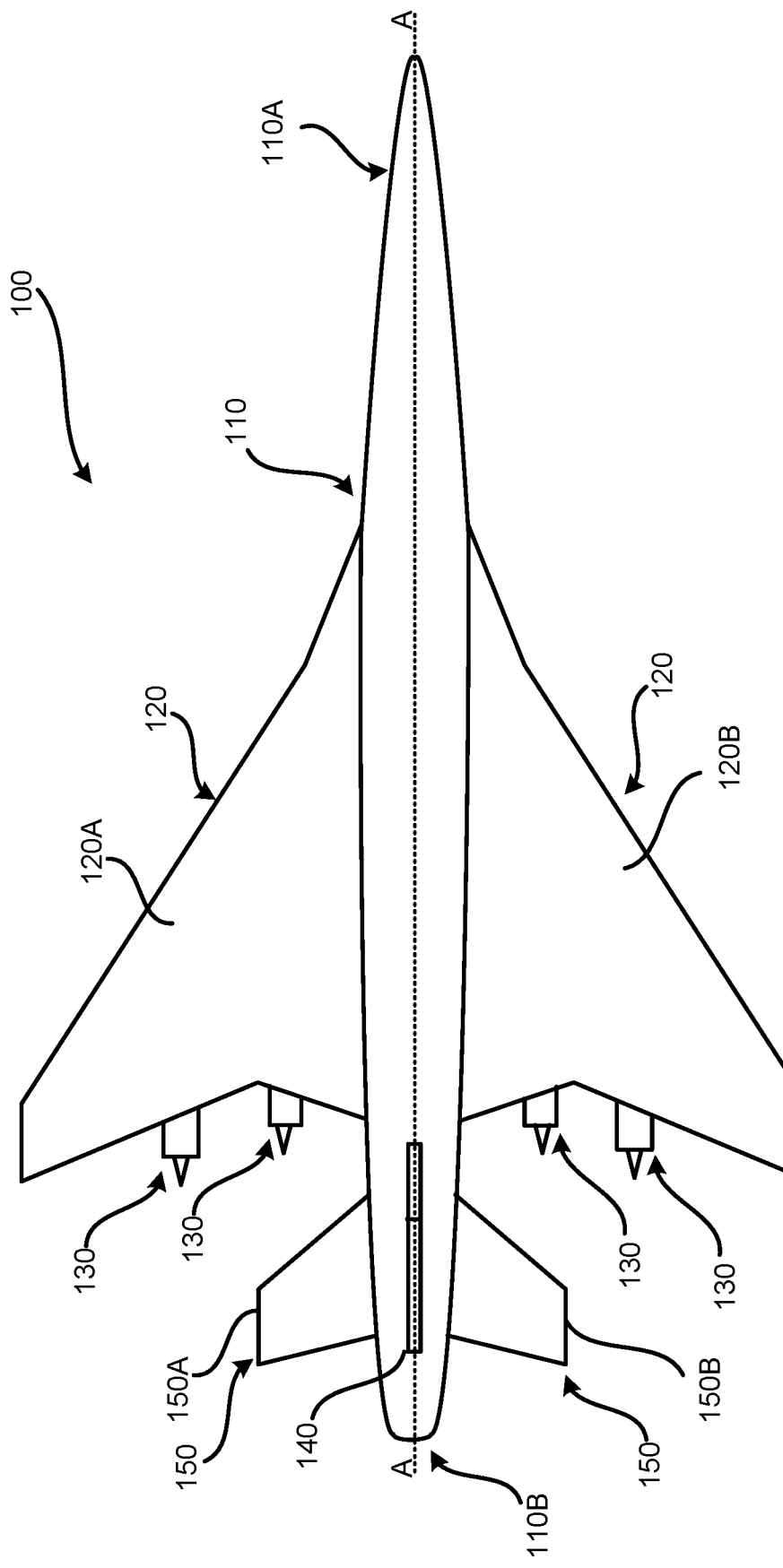
FIG. 1C is a top view of the example aircraft shown in FIGS. 1A and 1B.
Figure 1D:
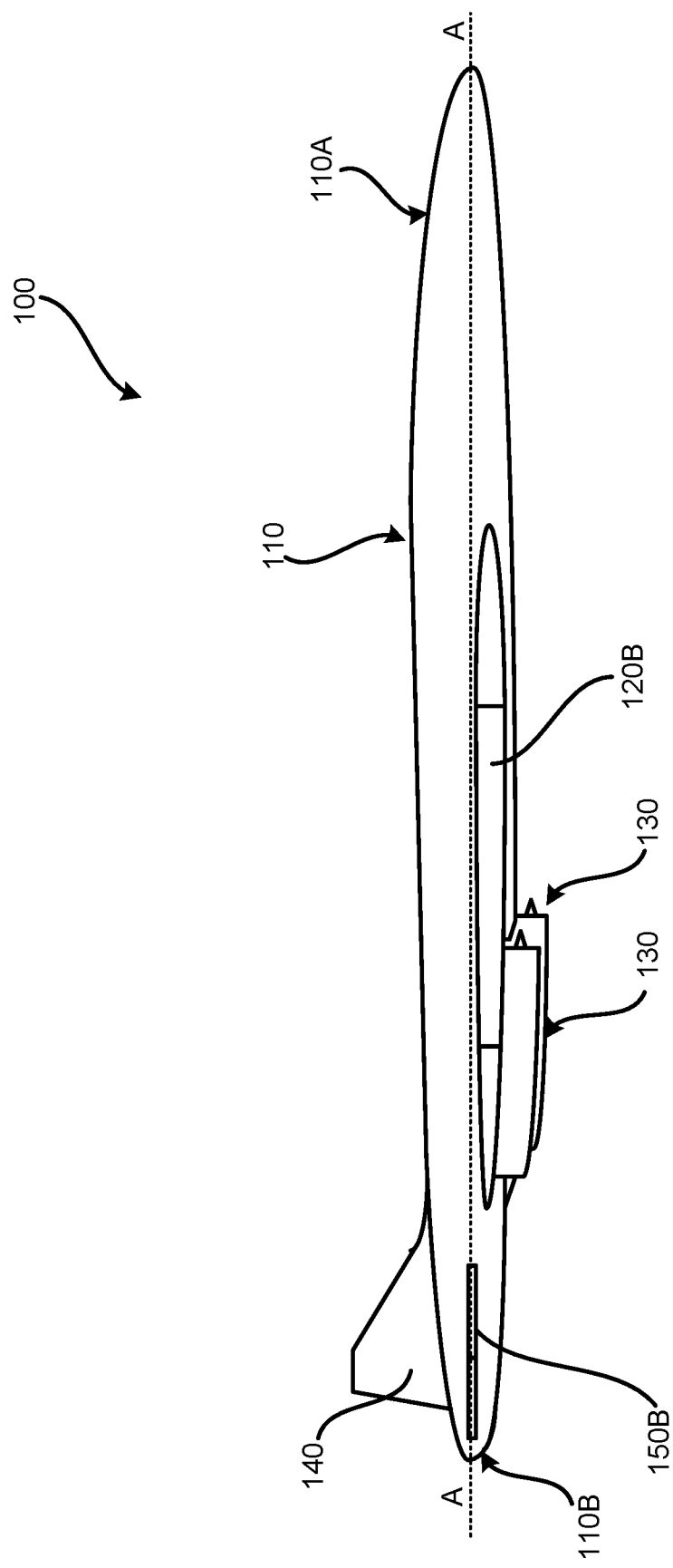
FIG. 1D is a side view of the example aircraft shown in FIGS. 1A-1C.
Figure 1E:
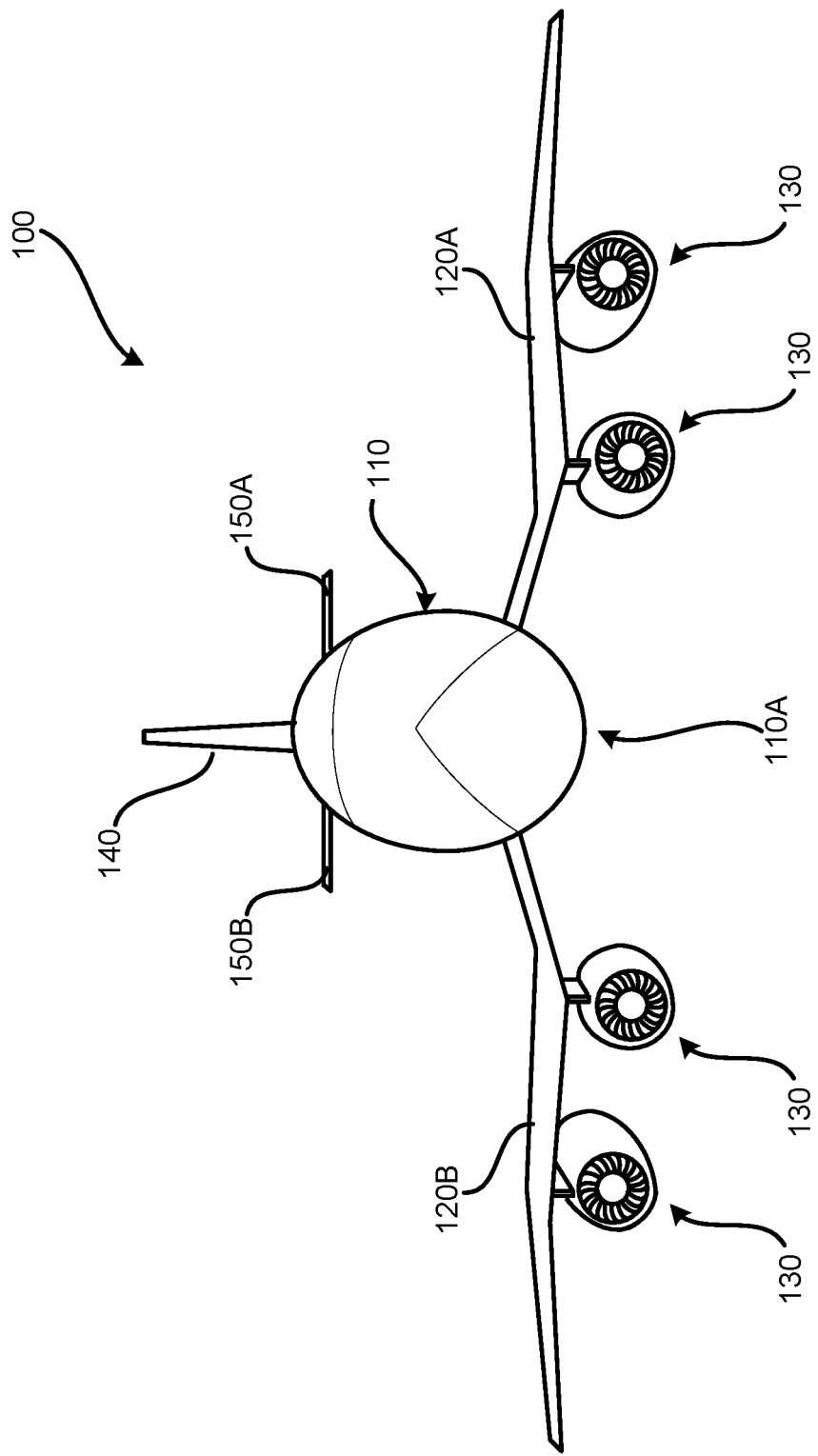
FIG. 1E is a front view of the example aircraft shown in FIGS. 1A-1D.
Figure 1F:
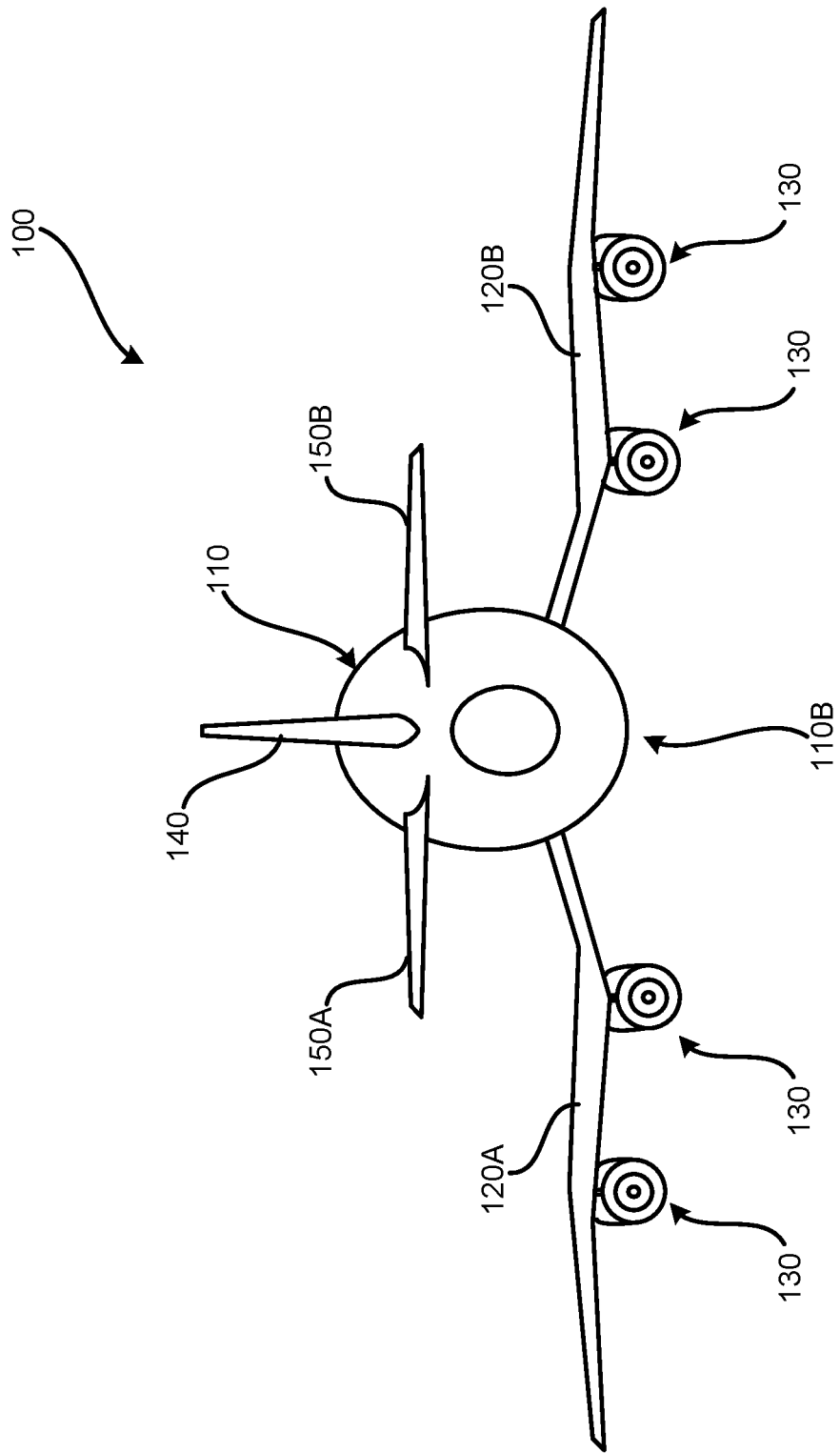
FIG. 1F is a rear view of the example aircraft shown in FIGS. 1A-1E.

FIGS. 1A-1F present various views of an example aircraft 100. In particular, FIG. 1A is a front perspective view, FIG. 1B is a rear perspective view, FIG. 1C is a top view, FIG. 1D is a side view, FIG. 1E is a front view, and FIG. 1F is a rear view, of the example aircraft 100. The example aircraft 100 shown in FIGS. 1A-1F is provided simply for purposes of discussion and illustration. The principles to be described herein may be applied to other types of aircraft, having other configurations, and/or including other features and/or combinations of features arranged differently than what is explicitly shown in FIGS. 1A-1F.

The example aircraft 100 is defined by an aircraft structure including a main body 110, or a fuselage, extending from a forward end portion 110A to an aft end portion 110B. The structure of the example aircraft 100 includes a pair of wings 120, including a first wing 120A on a first side portion of the main body 110, and a second wing 120B on a second side portion of the main body 110. In the example arrangement shown in FIGS. 1A-1F, the wings 120 are mounted at an intermediate portion of the structure of the example aircraft 100, simply for purposes of discussion and illustration. In the example arrangement shown in FIGS. 1A-1F, the example wings 120 have a delta configuration, simply for purposes of discussion and illustration. A propulsion system of the example aircraft 100 may be mounted to the structure of the aircraft 100. In the example shown in FIGS. 1A-1F, the propulsion system includes a plurality of engines 130, mounted, for example, on the wings 120. The propulsion system, including the example engines 130, may be mounted at other portions of the structure of the aircraft 100. The example arrangement shown in FIGS. 1A-1F includes four engines 130 symmetrically arranged about a longitudinal centerline A of the example aircraft 100, with two engines 130 mounted on the first wing 120A, and two engines 130 mounted on the second wing 120B, simply for purposes of discussion and illustration. The principles to be described herein can be applied to an aircraft including more, or fewer engines 130, mounted differently, for example, at different portions of the structure defining the aircraft 100. The example aircraft 100 includes a plurality of stability and control devices provided at the aft end portion 110B of the aircraft 100. In the example arrangement shown in FIGS. 1A-1F, the plurality of stability and control devices includes a vertical tail 140 and a horizontal tail 150 including a first horizontal tail portion 150A on the first side portion of the main body 110, aft of the first wing 120A, and a second horizontal tail portion 150B on the second side portion of the main body 110, aft of the second wing 120B. The aircraft 100 can include other types of stability and control devices, provided at other portions of the structure of the aircraft 100. The example aircraft 100 and plurality of engines 130 may be designed to operate at both low speed/subsonic flight conditions, and at high speed/supersonic flight conditions.

A propulsion system, in accordance with implementations described herein, may operate in a first mode to provide for efficient high speed/supersonic cruise operation. In the first mode, the propulsion system may have a standard capture area that provides for capture of mass flow by a main propulsion component of the system. In some examples, the propulsion system may operate in a second mode to provide for reduced levels of noise output during low speed operation (for example, during take-off and/or landing). In the second mode, the propulsion system may have a greater, or increased capture area that provides for an increased capture of mass flow by the main propulsion component, together with an auxiliary propulsion component. The second propulsion component may be in a standby state in which the second propulsion component is not operational, for example, stowed within the aerodynamic profile of the aircraft, in the first mode, to preserve efficiency at high speed/supersonic cruise operation.

Figure 2:
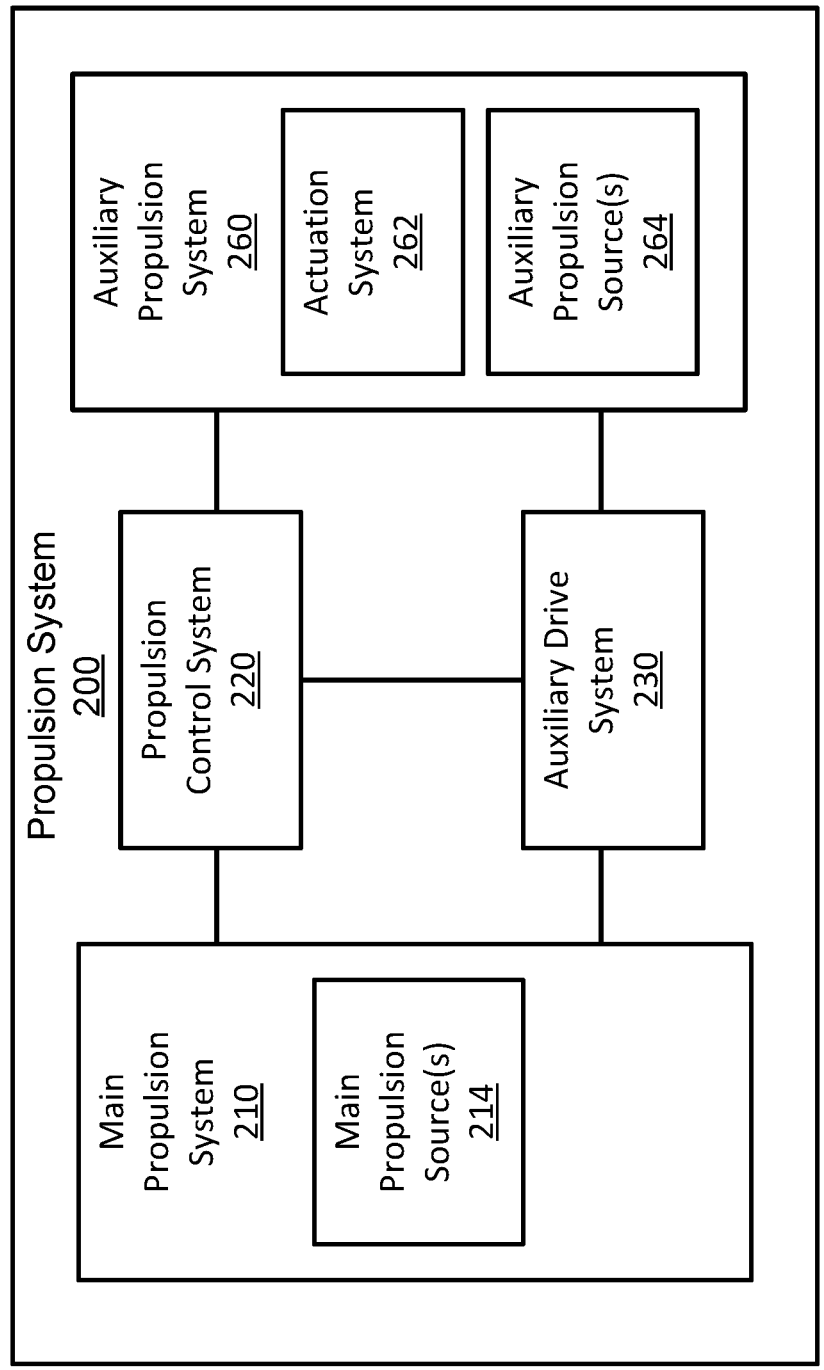
FIG. 2 is a block diagram of an example propulsion system, in accordance with implementations described herein.

FIG. 2 is a block diagram of an example propulsion system 200, in accordance with implementations described herein. The example propulsion system 200 may be incorporated into the example aircraft 100 described above, or another aircraft not explicitly described herein. The example propulsion system 200 may include a main propulsion system 210. The main propulsion system 210 may include a main propulsion source 214. In the example aircraft 100 described above, the main propulsion source 214 may include one or more engines, for example, one or more of the engines 130 (i.e., low bypass ratio engines 130) as described above, that provide for efficient high speed/supersonic cruise operation of the aircraft 100. The example propulsion system 200 may include an auxiliary propulsion system 260 that is coupled to the main propulsion system 210 via an auxiliary drive system 230, such that the auxiliary propulsion system 260 may be selectively driven by the main propulsion system 210 via the auxiliary drive system 230. In some examples, the auxiliary propulsion system 260 may be mechanically driven by power extracted from the main propulsion system 210 via the auxiliary drive system 230.

In some examples, the auxiliary drive system 230 may include, for example, an auxiliary gearbox coupled to the main propulsion source 214, with the auxiliary gearbox transferring a driving force extracted from the main propulsion source to drive an external shaft. Driving force from the external shaft (driven by the auxiliary gearbox) in this manner may, in turn, drive one or more elements of the auxiliary propulsion system 260. In some examples, such an auxiliary gearbox may include one or more gears in meshed engagement with/driven by, for example, an outer ring gear that rotates together with a rotating shaft of the main propulsion source 214. In some examples, the auxiliary gearbox may include one or more gears in meshed engagement with/driven by, for example, a bevel gear coupled via a radial shaft to a rotating shaft of the main propulsion source 214. In some examples, the auxiliary gearbox may include one or more gears in meshed engagement with/ driven by a bevel gear coupled via an axial shaft and spur gears to a rotating shaft of the main propulsion source 214. Various other arrangements may also be applicable in extracting a driving force from the main propulsion source 214 for driving of the auxiliary propulsion system 260.

The auxiliary propulsion system 260 may include an auxiliary propulsion source 264 that is selectively driven by the main propulsion system 210 (for example, by power extracted from the main propulsion source 214 by the auxiliary drive system 230) during low speed operation of the aircraft 100. In some examples, the auxiliary propulsion source 264 may include one or more auxiliary thrust fans that are driven, via the auxiliary drive system 230, by the main propulsion source 214 (i.e., by one or more of the high bypass ratio engines 130 of the aircraft 100). In some examples, the one or more auxiliary thrust fans may be selectively actuated, via an actuation system 262 of the auxiliary propulsion system 260, under the control of a propulsion control system 220. For example, the one or more auxiliary thrust fans may be transitioned, from a stowed state (in which the one or more auxiliary thrust fans are in a standby state, and not operational) to an actuated state, or a deployed state, in response to detection of a condition in which an increase in airflow capture area may be beneficial, such as low speed operation of the aircraft 100. Similarly, the one or more auxiliary thrust fans may be transitioned, from the actuated state, or the deployed state, to the stowed state, in response to detection of a condition in which the greater, or increased airflow capture area is no longer necessary, such as high speed/supersonic cruise operation of the aircraft 100.

During low speed operation of the aircraft 100, the one or more auxiliary thrust fans of the auxiliary propulsion system 260, driven by power extracted from the main propulsion system 210, may augment or supplement the airflow capture area of the main propulsion system 210 (i.e., the one or more low bypass ratio engines 130). The greater, or increased airflow capture area provided by the auxiliary propulsion system 260, together with that of the main propulsion system 210, may mimic the effect of a high bypass ratio engine during the low speed flight condition. The decreased acceleration of airflow through the core of the main propulsion system 210 provides a reduction in noise during the low speed flight condition. The transition of the auxiliary propulsion system 260 back to the standby state, in which the auxiliary propulsion system 260 is stowed, for example, within the aerodynamic profile of the aircraft 100 and not operational, may preserve the efficiency of the operation of the main propulsion system 210 during high speed/supersonic cruise conditions.

Figure 3A:
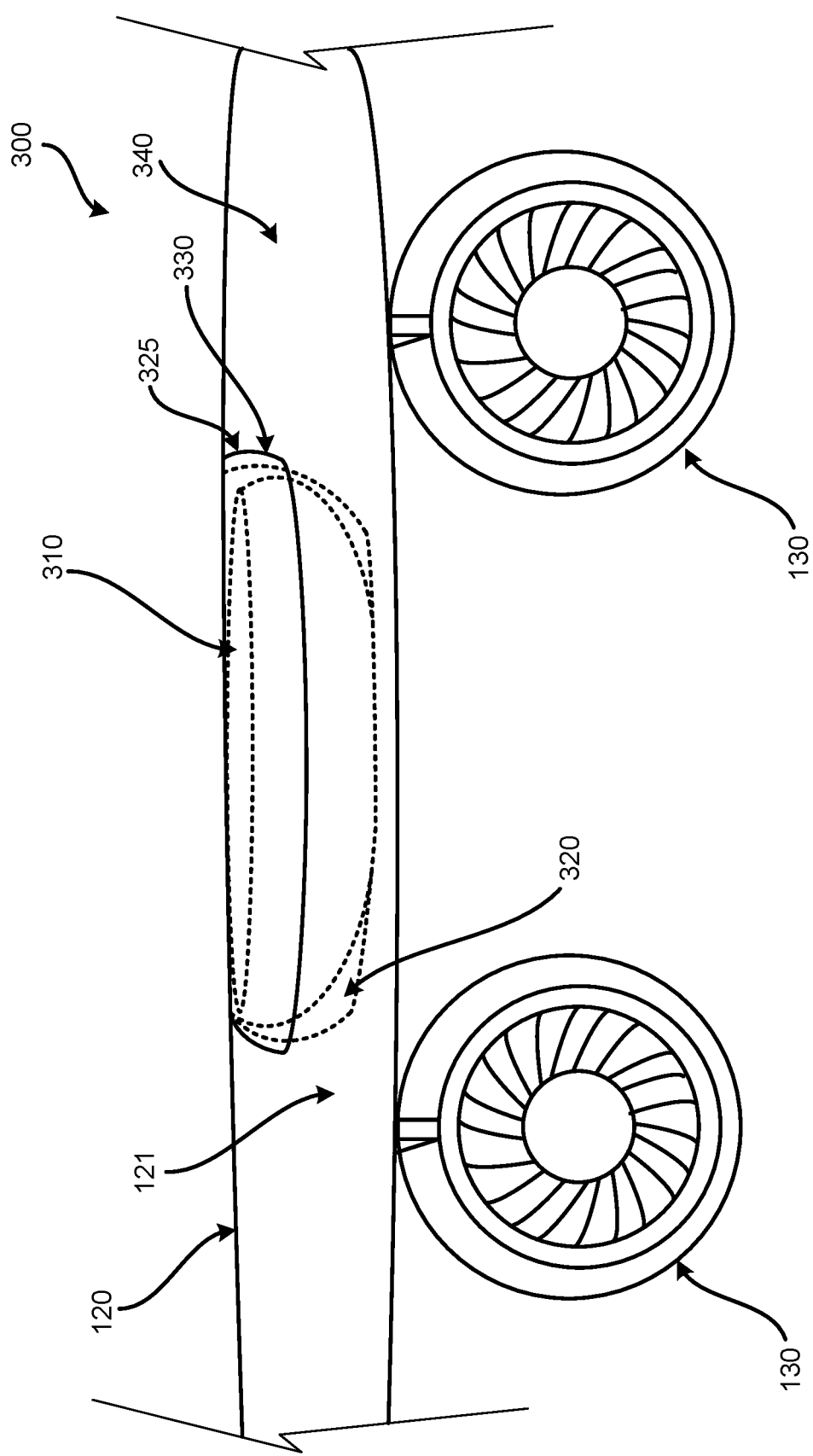
FIG. 3A is a partial front view of an example wing of an example aircraft, illustrating a stowed state of an example auxiliary thrust fan of an example auxiliary propulsion system, in accordance with implementations described herein.
Figure 3B:
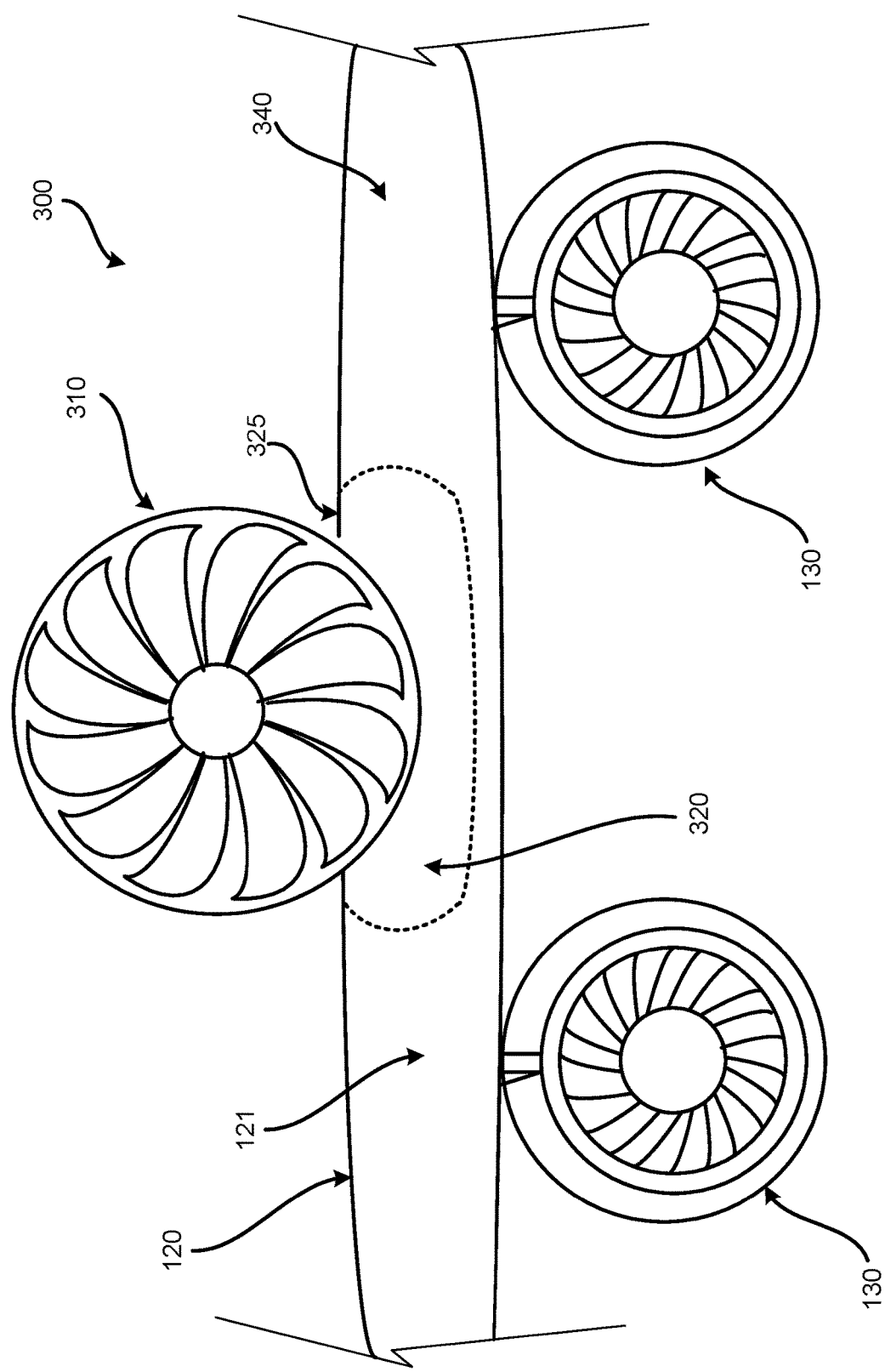
FIG. 3B is a partial front view of the example wing, illustrating a deployed state of the example auxiliary thrust fan shown in FIG. 3A.
Figure 3C:
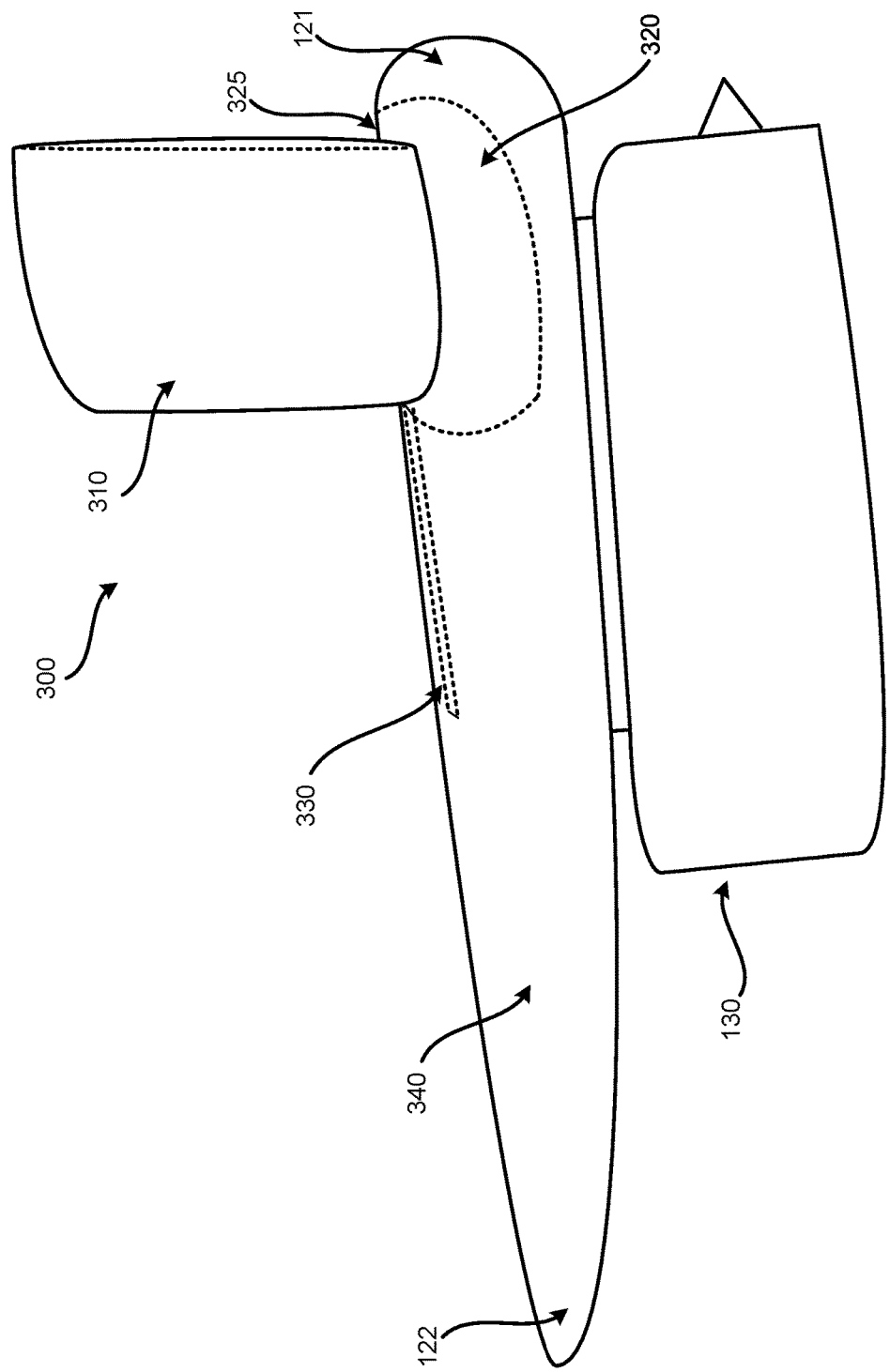
FIG. 3C is a side view of the example wing, illustrating the deployed state of the example auxiliary thrust fan shown in FIGS. 3A and 3B.

FIGS. 3A-3C illustrate operation of an example propulsion system 300, in accordance with implementations described herein. Principles described above with respect to the propulsion system 200 shown in FIG. 2 may be applicable to the operation of the example propulsion system 300 shown in FIGS. 3A-3C. FIGS. 3A-3C illustrate a portion of one of the pair of wings 120 (the first wing 120A and/or the second wing 120B), simply for ease of discussion and illustration. The principles to be described herein may be applied to systems provided in the first wing 120A and/or systems provided in the second wing 120B.

FIG. 3A is a front view of the wing 120, as viewed from a leading edge portion 121 of the wing 120, between the two low bypass ratio engines 130 mounted on the wing 120. The propulsion system 300 shown in FIGS. 3A-3C includes a main propulsion system 210 including a main propulsion source 214, in the form of the low bypass ratio engines 130, and an auxiliary propulsion system 260 including an auxiliary propulsion source 264 in the form of an auxiliary thrust fan 310. In the first mode of operation of the propulsion system 300, i.e., high speed/supersonic cruise operation of the aircraft 100, the auxiliary thrust fan 310 is in a stowed state, received in a compartment 320 formed in an interior space within the wing 120, as shown in FIG. 3A. A panel, or door 330 may extend across an opening 325 formed in an outer skin 340 of the wing 120, corresponding to the compartment 320, to enclose the compartment 320. The outer skin 340, together with the door 330 positioned across the opening 325, may define an outer contour of the wing 120. That is, in the stowed state of the auxiliary thrust fan 310, the door 330 may be substantially flush with the outer skin 340 of the wing 120, such that the door 330 defines a corresponding portion of the outer contour of the wing 120. In the stowed state, the auxiliary thrust fan 310 does not extend out into the airflow path of the aircraft 100, and is confined within the aerodynamic profile of the aircraft 100. Thus, in the stowed state, the auxiliary thrust fan 310 has little to no negative impact on the cross-sectional area of the wing 120, and on overall performance of the aircraft 100.

In some examples, the door 330 may be movably coupled relative to the compartment 320. In the second mode of operation of the propulsion system 300, the auxiliary thrust fan 310 is in a deployed state, or an actuated state, as shown in the front view of FIG. 3B and the side view of FIG. 3C. In the deployed state, or actuated state shown in FIGS. 3B and 3C, the door 330 has moved toward the trailing edge portion 122 of the wing 120 and has been retracted into the interior space defined within the wing 120. Movement of the door 330 in this manner allows the auxiliary thrust fan 310 to be extended out, through the opening 325, and into the airflow path of the aircraft 100. In some examples, the door 330 may move along an exterior surface of the outer skin 340 of the wing 120 (not shown in FIGS. 3B and 3C) away from the opening 325 of the compartment 320 and towards the trailing edge portion 122 of the wing 120. An actuation mechanism (not shown), for example, an actuation mechanism of the actuation system 262 described above with respect to FIG. 2, may trigger movement of the door 330 in this manner. Similarly, an actuation mechanism (not shown), for example, an actuation mechanism of the actuation system 262 described above with respect to FIG. 2, may trigger deployment of the auxiliary thrust fan 310, from the stowed state shown in FIG. 3A to the deployed state, or actuated state, shown in FIGS. 3B and 3C. Movement of the door 330, and deployment of the auxiliary thrust fan 310, may be initiated by the propulsion control system 220 described above with respect to FIG. 2, in response to detection of low speed operation of the aircraft 100, for example, in a take-off or landing situation, in which it may be desirable to increase airflow capture area to reduce noise associated with operation of the aircraft 100. In some examples, a deployment orientation of the auxiliary thrust fan 310 in the deployed state may be varied, based on flight conditions, numbers of auxiliary thrust fans 310 in use, thrust requirements, and other such factors.

As noted above, a single auxiliary thrust fan 310, operably coupled in one of the pair of wings 120, is shown in FIGS. 3A-3C, for ease of discussion and illustration. In some examples, one or more auxiliary thrust fans 310 may be operably coupled in the first wing 120A, and one or more auxiliary thrust fans 310 may be operably coupled in the second wing 120B. Multiple auxiliary thrust fans 310 may have different sizes and/or dimensions and/or capacities. Similarly, the auxiliary thrust fan 310 shown in FIGS. 3A-3C is positioned between two adjacent high bypass ratio engines mounted on the wing 120, simply for ease of discussion and illustration. The principles described herein may be applied to auxiliary thrust fans 310 positioned at other positions along the span of the wing 120. Additionally, the auxiliary thrust fan 310 shown in FIGS. 3A-3C is positioned closer to the leading edge portion 121 of the wing 120, simply for ease of discussion and illustration. The principles described herein may be applied to auxiliary thrust fans 310 positioned at other positions along the chord of the wing 120. In some examples, the individual auxiliary thrust fans of the plurality of auxiliary thrust fans 310 are independently controllable. In some examples, an operating speed of the individual auxiliary thrust fans of the plurality of auxiliary thrust fans 310 is independently controllable. In some examples, an orientation of the individual auxiliary thrust fans of the plurality of auxiliary thrust fans 310 is independently controllable. In some examples, other operating parameters of the plurality of auxiliary thrust fans 310 are independently controllable.

As described above, in the first mode of operation, corresponding to high speed/supersonic cruise conditions, the one or more auxiliary thrust fans 310 may be in the stowed state within the interior of the wing 120, as shown in FIG. 3A. In the stowed state, the one or more auxiliary thrust fans 310 are contained within the aerodynamic profile of the aircraft, and do not extend out into the airflow path of the aircraft 100. Thus, in the stowed state, the one or more auxiliary thrust fans 310 have little to no negative impact on the cross-sectional area of the wing 120, and of the aircraft 100. Accordingly, in the first mode of operation of the propulsion system 300, the one or more auxiliary thrust fans 310 have little to no adverse impact on drag during high speed/supersonic cruise operation of the aircraft 100. In the first mode of operation, propulsion of the aircraft 100 is provided by the operation of the low bypass ratio engines 130, maintaining efficiency afforded by the low bypass ratio engines at high speed/supersonic cruise speed conditions.

In the second mode of operation of the propulsion system 300, corresponding to low speed operation such as take-off or landing conditions, the one or more auxiliary thrust fans 310 may be transitioned from the stowed state to the deployed state, or actuated state, shown in FIGS. 3B and 3C. In the deployed state, the one or more auxiliary thrust fans 310 extend out into the airflow path of the aircraft 100, and are driven, for example, mechanically driven, by the low bypass ratio engines 130. The driving of the one or more auxiliary thrust fans 310 by the low bypass ratio engines 130 reduces an exit velocity from the low bypass ratio engines 130, thus reducing noise levels generated by operation of the low bypass ratio engines at low speeds. Operation of the one or more auxiliary thrust fans 310 (driven by the low bypass ratio engines 130) increases an overall airflow/mass flow capture area of the propulsion system 300. This increases the airflow/mass flow and thrust produced by the propulsion system 300 (the low bypass ratio engines 130 and the one or more auxiliary thrust fans 310) in the first mode, and compensates for the losses due to the lower speed operation of the low bypass ratio engines 130. Thus, the addition of the one or more auxiliary thrust fans 310 during low speed operation, i.e., at take-off and/or landing, mimics the operation of higher bypass ratio engines having a larger capture area, without the need to actually increase capture area associated with the main engines and incur the associated drag penalties during high speed/cruise operation.

Figure 4:
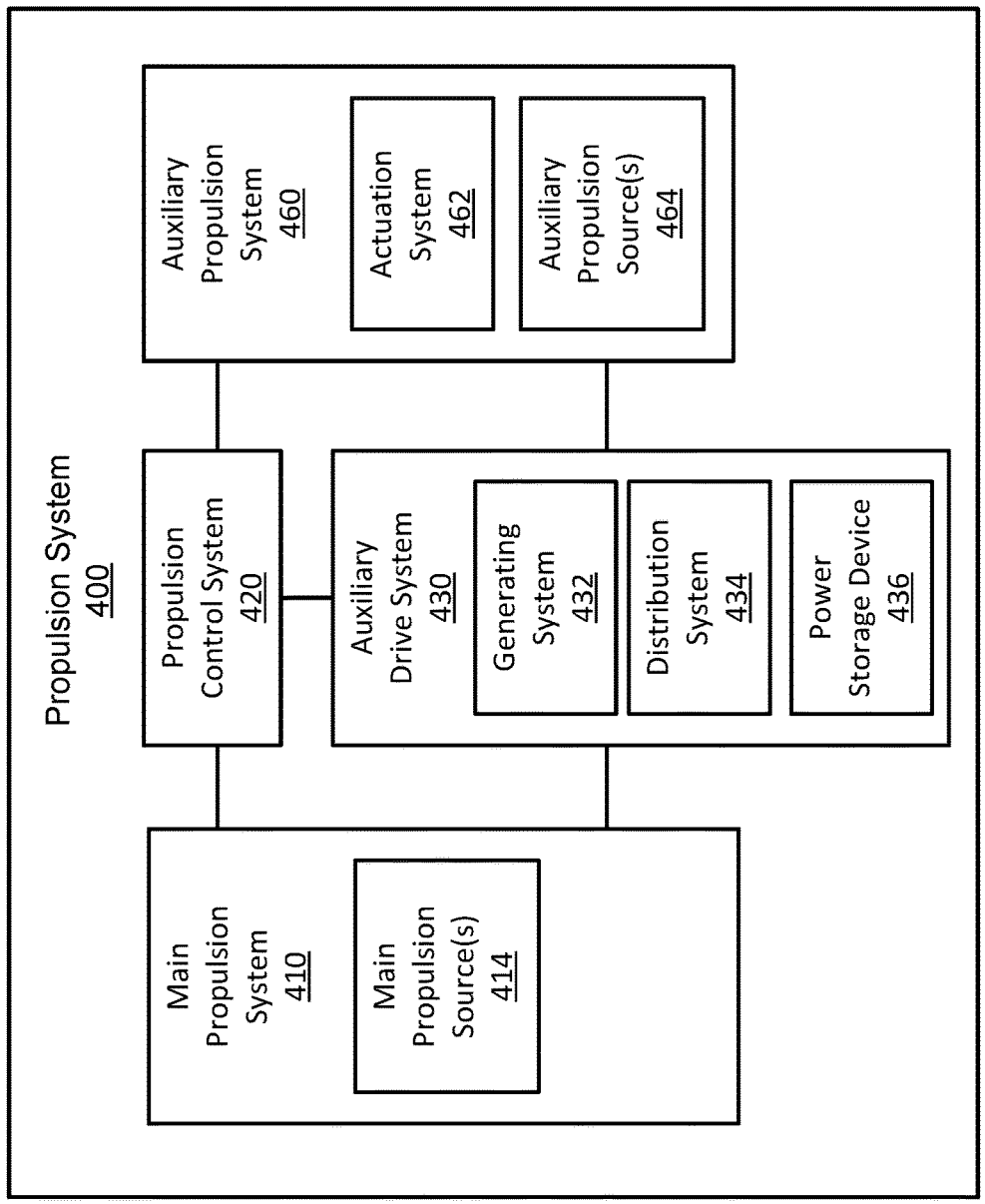
FIG. 4 is a block diagram of an example propulsion system, in accordance with implementations described herein.

FIG. 4 is a block diagram of an example propulsion system 400, in accordance with implementations described herein. The example propulsion system 400 may be incorporated into the example aircraft 100 described above, or another aircraft not explicitly described herein. The example propulsion system 400 may include a main propulsion system 410. The main propulsion system 410 may include a main propulsion source 414. In the example aircraft 100 described above, the main propulsion source 414 may include the one or more low bypass ratio engines 130 that provide for efficient high speed/supersonic cruise operation of the aircraft 100. The example propulsion system 400 may include an auxiliary propulsion system 460 that is coupled to the main propulsion system 410 via an auxiliary drive system 430, such that the auxiliary propulsion system 460 may be selectively driven by the main propulsion system 410. In some examples, the auxiliary propulsion system 460 may be electrically driven by power extracted from the main propulsion system 410 via the auxiliary drive system 430.

In some examples, the auxiliary propulsion system 460 includes an auxiliary propulsion source 464 that is selectively driven by the main propulsion system 410 via the auxiliary drive system during low speed operation of the aircraft 100. In some examples, the auxiliary propulsion source 464 may include a plurality of auxiliary thrust fans that are driven, via the auxiliary drive system 430, by the main propulsion source 414 (i.e., by one or more of the high bypass ratio engines 130 of the aircraft 100). In some examples, the auxiliary drive system 430 may include a generating system 432 that is operably coupled to the main propulsion source 414, i.e., to one or more of the low bypass ratio engines 130. The generating system 432 may convert shaft power output by a rotational shaft of the low bypass ratio engine 130 to electrical power. In some examples, the generating system 432 may include one or more elements as described above with respect to the auxiliary drive system 230 of the propulsion system 200 shown in FIG. 2. For example, as described above with respect to FIG. 2, in some examples, an external shaft driven by an auxiliary gearbox of the auxiliary drive system 430 may drive an electric motor of the generating system 432 to generate electric power that can be distributed and/or stored. In some examples, the generating system 432 may include one or more elements coupled to a rotational shaft of the low bypass ratio engine(s) 130, for example, a turbine shaft of the engine(s). Interaction with one or more complementary elements, for example positioned at a casing of the engine(s) 130 as the rotational shaft rotates, may generate an electrical field from which electrical energy can be captured and stored.

The stored electrical energy may be selectively distributed to the auxiliary propulsion source 464 via a distribution system 434 including, for example, a cabling system and the like. In some examples, the auxiliary drive system 430 may include a power storage device 436, such as a battery, that is connected to the generating system 432. In some examples, the power storage device 436 can accumulate electrical power generated by the generating system 432 and store unused electrical power for later use. In some examples, the power storage device 436 is connected to the distribution system 434 so that the stored electrical power can be distributed for operation of other aircraft operating systems.

In some examples, the plurality of auxiliary thrust fans may be selectively actuated, via an actuation system 462 of the auxiliary propulsion system 460, under the control of a propulsion control system 420. For example, the plurality of auxiliary thrust fans may be transitioned, from a stowed state, in which the plurality of auxiliary thrust fans are in a standby state, and inoperable, to an actuated state, or a deployed state, in response to detection of a condition in which an increased airflow capture area may be beneficial, such as low speed operation of the aircraft 100. Similarly, the plurality of auxiliary thrust fans may be transitioned, from the actuated state, or the deployed state, to the stowed state, in response to detection of a condition in which the increased airflow capture area is no longer necessary, such as high speed/supersonic cruise operation of the aircraft 100. During low speed operation of the aircraft 100, the plurality of auxiliary thrust fans of the auxiliary propulsion system 460, driven by power extracted from the main propulsion system 410, may augment or supplement the airflow capture area of the main propulsion system 410 (i.e., the one or more low bypass ratio engines 130). The increased airflow capture area provided by the auxiliary propulsion system 460, together with that of the main propulsion system 410, may mimic the effect of a high bypass ratio engine during the low speed flight condition. The decreased acceleration of airflow through the core of the main propulsion system 410 provides a reduction in noise during the low speed flight condition. The transition of the auxiliary propulsion system 460 back to the stowed state, for example, within the aerodynamic profile of the aircraft 100, may preserve the efficiency of the operation of the main propulsion system 410 during high speed/supersonic cruise conditions.

Figure 5A:
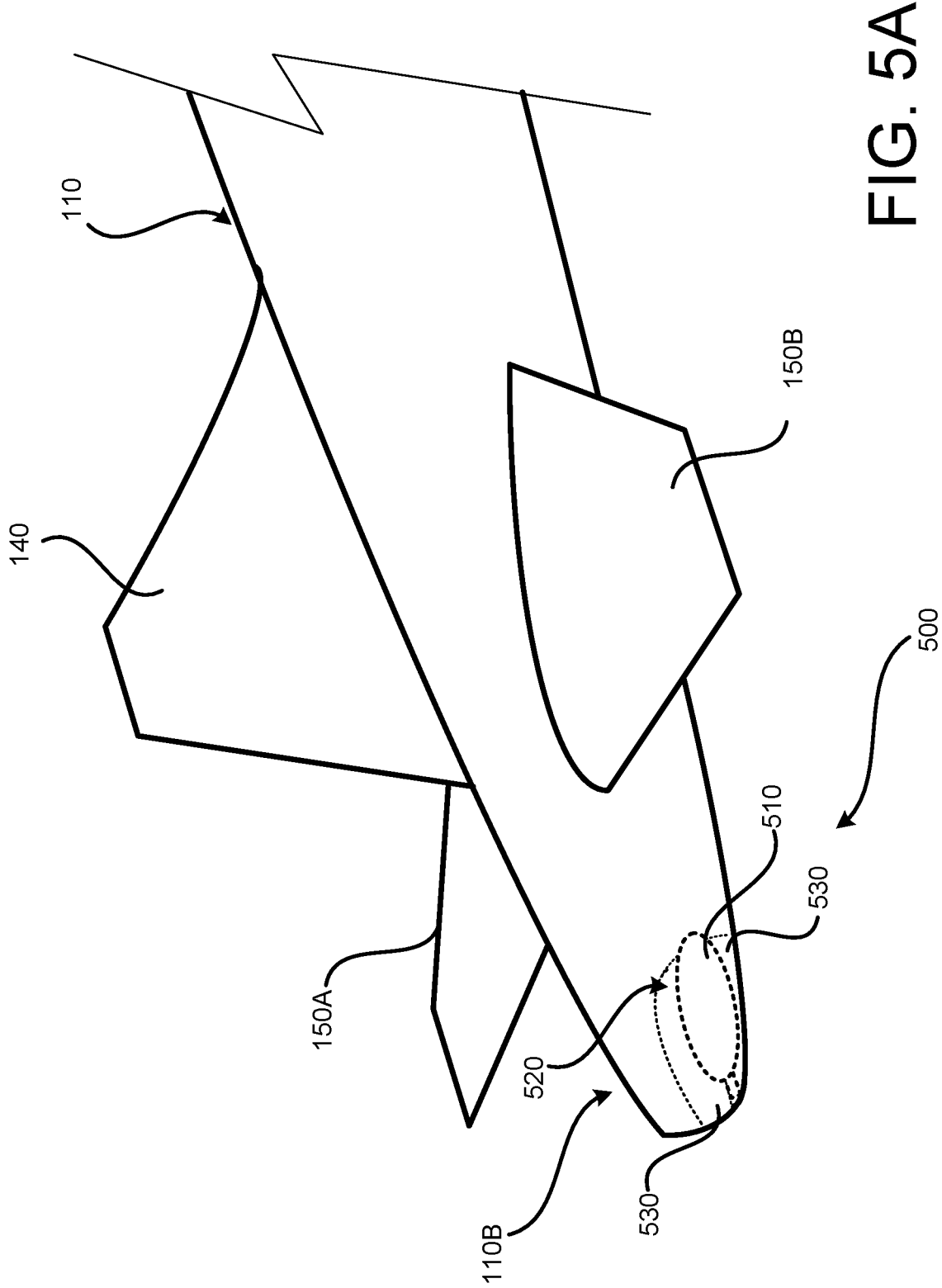
FIG. 5A is a perspective view of an aft portion of an example aircraft, illustrating a stowed state of an example auxiliary thrust fan of an example auxiliary propulsion system, in accordance with implementations described herein.
Figure 5B:
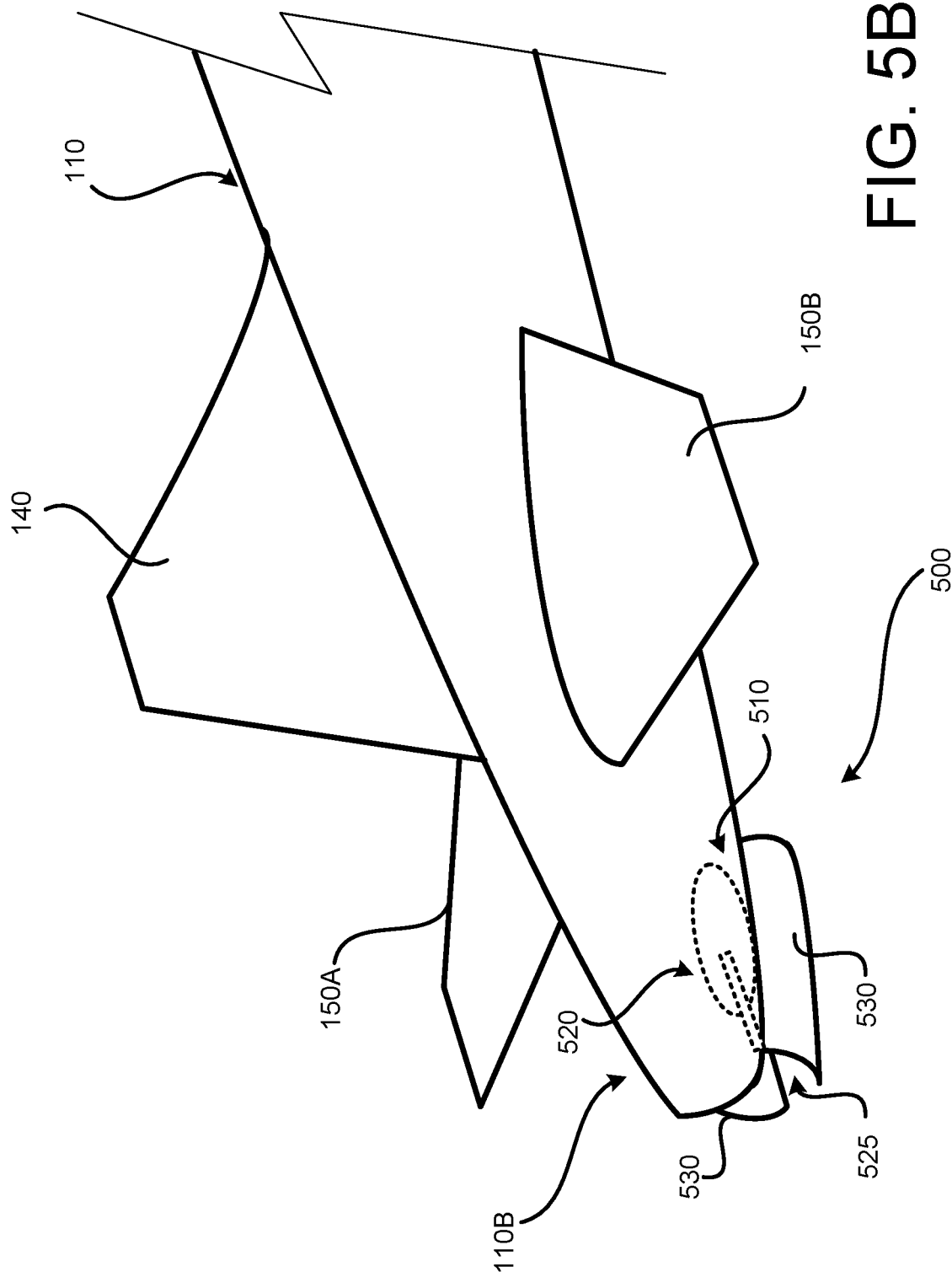
FIG. 5B is a perspective view of the aft portion of the example aircraft, illustrating a partially deployed state of the example auxiliary thrust fan shown in FIG. 5A.
Figure 5C:
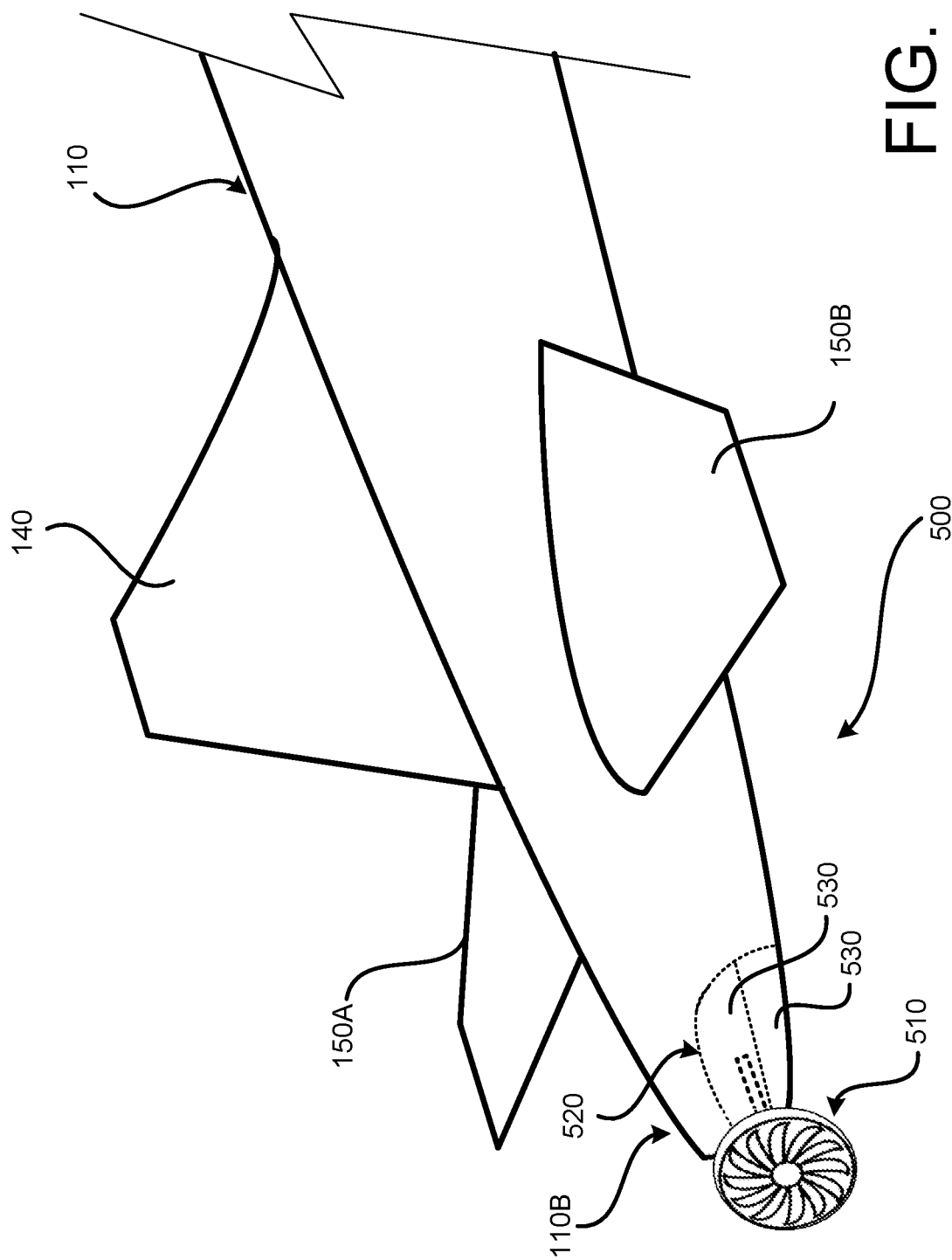
FIG. 5C is a perspective view of the aft portion of the example aircraft, illustrating a fully deployed state of the example auxiliary thrust fan shown in FIGS. 5A and 5B.

FIGS. 5A-5C illustrate operation of an example propulsion system 500, in accordance with implementations described herein. Principles described above with respect to the propulsion system 400 shown in FIG. 4 may be applicable to the operation of the example propulsion system 500 shown in FIGS. 5A-5C.

FIGS. 5A-5C are rear perspective views of the aft end portion 110B of the main body 110 of the example aircraft 100, including the vertical tail 140 and the horizontal tail 150 (i.e., the first horizontal tail portion 150A and the second horizontal tail portion 150B). The propulsion system 500 shown in FIGS. 5A-5C includes a main propulsion system 410 including a main propulsion source 414, in the form of the low bypass ratio engines 130 mounted on the wings 120 (not shown in FIGS. 5A-5C). The propulsion system 500 includes an auxiliary propulsion system 460 including an auxiliary propulsion source 464 in the form of an auxiliary thrust fan 510.

In the first mode of operation of the propulsion system 500, corresponding, for example, to high speed/supersonic cruise operation of the aircraft 100, the auxiliary thrust fan 510 is in a stowed state, received in a compartment 520 formed within the aft end portion 110B of the main body 110, as shown in FIG. 5A. One or more doors 530 may extend across an opening 525 formed in a portion of the aft end portion 110B of the main body 110, corresponding to the compartment 520. In the closed position shown in FIGS. 5A and 5C, the one or more doors 530 may be substantially flush with the outer skin of the aircraft 100 defining the aft end portion 110B of the main body 110, thus defining a corresponding portion of the outer contour of the aft end portion 110B of the main body 110. In the stowed state, the auxiliary thrust fan 510 does not extend out into the airflow path of the aircraft 100, and is confined within the aerodynamic profile of the aircraft 100. Thus, in the stowed state, the auxiliary thrust fan has little to no negative impact on cross-sectional area of the aft end portion 110B of the main body 110, and the overall performance of the aircraft 100.

As shown in FIG. 5B, the one or more doors 530 may be movably coupled relative to interior structure (not shown in FIGS. 5A-5C) of the aft end portion 110B of the main body 110. In the example shown in FIG. 5B, the doors 530 are rotatably coupled relative to the aft end portion 110B of the main body 110, simply for ease of discussion and illustration. In some examples, the one or more doors 530 may be slidably coupled and retracted into to the aft end portion 110B of the main body 110 or along an exterior surface of the aft end portion 110B, and the like. In the second mode of operation of the propulsion system 500, in which the auxiliary thrust fan 510 is in a deployed state, or an actuated state, as shown in FIG. 5C, the doors 530 have moved relative to the opening 525 formed in the aft end portion 110B of the main body 110, allowing the auxiliary thrust fan 510 to be extended out, through the opening 525. An actuation mechanism (not shown in FIGS. 5A-5C), for example, an actuation mechanism of the actuation system 462 described above with respect to FIG. 4, may cause movement of the doors 530 in this manner. Similarly, an actuation mechanism (not shown in FIGS. 5A-5C), for example, an actuation mechanism of the actuation system 462 described above with respect to FIG. 4, may cause deployment of the auxiliary thrust fan 510, from the stowed state shown in FIG. 5A to the deployed state, or actuated state, shown in FIG. 5C. Movement of the doors 530, and deployment of the auxiliary thrust fan 510, may be initiated by the propulsion control system 420 described above with respect to FIG. 4, in response to detection of a condition in which increased airflow capture area may be beneficial. Such a condition may include low speed operation of the aircraft 100, for example, in a take-off or landing situation and the like, in which it may be desirable to increase airflow capture area to reduce noise associated with operation of the aircraft 100. In some examples, an orientation of the auxiliary thrust fan 510 in the deployed state may be varied, based on flight conditions, position on the aircraft 100, numbers of auxiliary thrust fans in use, thrust requirements, and other such factors.

As described above, in the first mode of operation, corresponding to high speed/supersonic cruise conditions, the auxiliary thrust fan 510 may be in the stowed state within the interior of the aft end portion 110B of the main body 110, as shown in FIG. 5A. In the stowed state, the auxiliary thrust fan 510 is contained within the aerodynamic profile of the aircraft 100, and has little to no negative impact on the cross-sectional area of the wing 120, and on overall performance of the aircraft 100. Accordingly, in the first mode of operation, the auxiliary thrust fan 510 has little to no adverse impact on drag during high speed/supersonic cruise operation of the aircraft 100. In the first mode of operation, propulsion of the aircraft 100 is provided by the operation of the low bypass ratio engines 130, maintaining efficiency afforded by the low bypass ratio engines at high speed/supersonic cruise speed conditions.

In the second mode of operation of the propulsion system 300, corresponding to a condition in which increased airflow capture area may beneficial, such as low speed operation during take-off or landing, the auxiliary thrust fan 510 may be transitioned from the stowed state to the deployed state, or actuated state, shown in FIG. 5C. In the deployed state, the auxiliary thrust fan 510 may be driven, via components of the auxiliary drive system including the generating system 432 and the distribution system 434 described above with respect to FIG. 4, by the low bypass ratio engines 130. The driving of the auxiliary thrust fan 510 by electrical power extracted from the low bypass ratio engines 130 in this manner reduces an exit velocity from the low bypass ratio engines 130, thus reducing noise levels generated by operation of the low bypass ratio engines 130 at low speeds. Operation of the auxiliary thrust fan 510 (driven by the low bypass ratio engines 130) increases an overall airflow/mass flow capture area of the propulsion system 500, increasing the airflow/mass flow and thrust produced by the propulsion system 500 in the first mode, and compensating for the losses due to the lower speed operation of the low bypass ratio engines 130. Thus, the addition of the auxiliary thrust fan 510 during low speed operation, i.e., at take-off and/or landing, mimics the operation of higher bypass ratio engines, without the need to actually increase capture area of the main engines and incur the associated drag penalties during high speed/cruise operation.

FIGS. 6A-6E illustrate operation of an example propulsion system 600, in accordance with implementations described herein. Principles described above with respect to the propulsion system 400 shown in FIG. 4 may be applicable to the operation of the example propulsion system 600 shown in FIGS. 6A-6E.

Figure 6A:
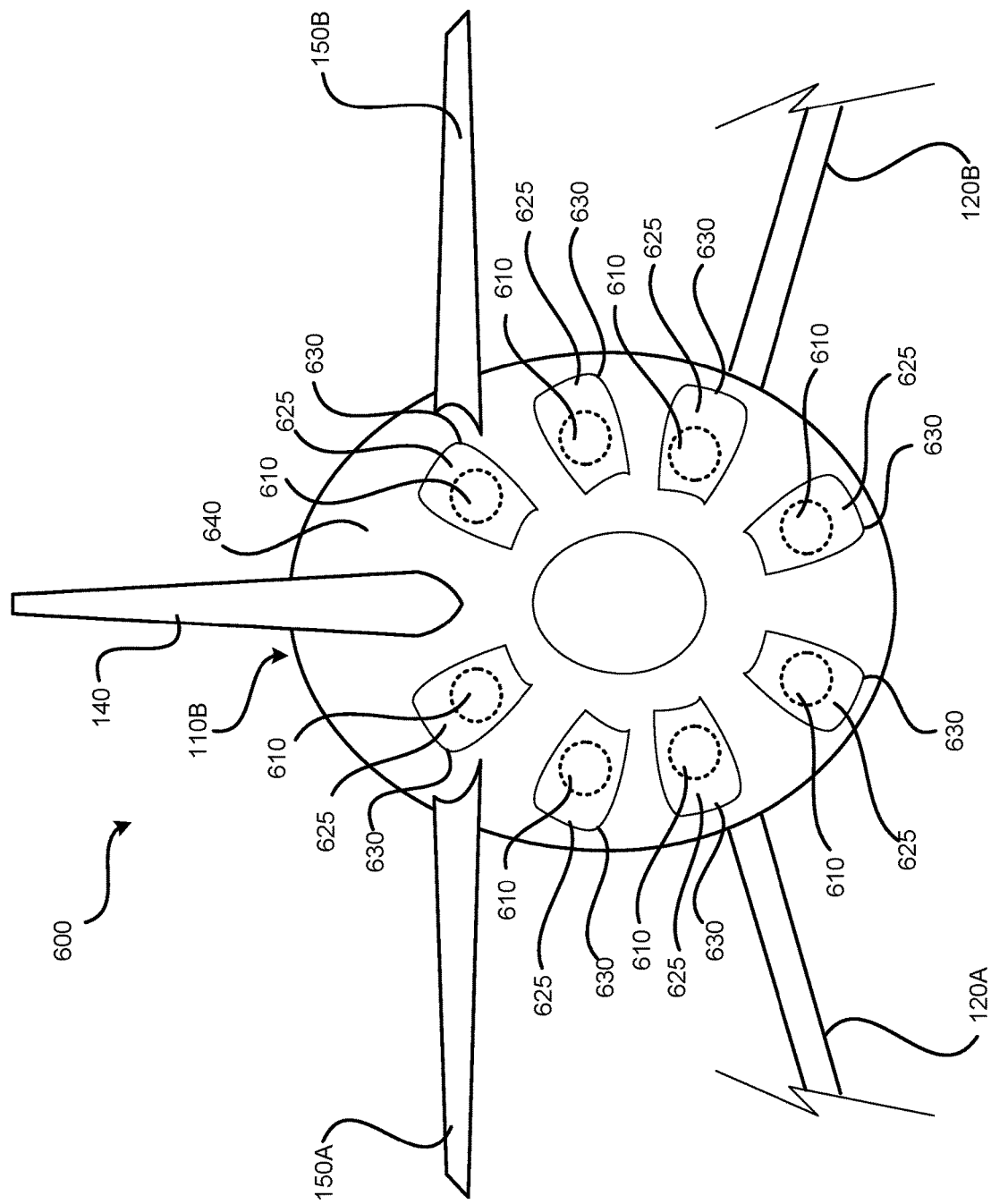
FIG. 6A is a rear view of an example aircraft, illustrating a stowed state of an example plurality of auxiliary thrust fans of an example auxiliary propulsion system, in accordance with implementations described herein.
Figure 6B:
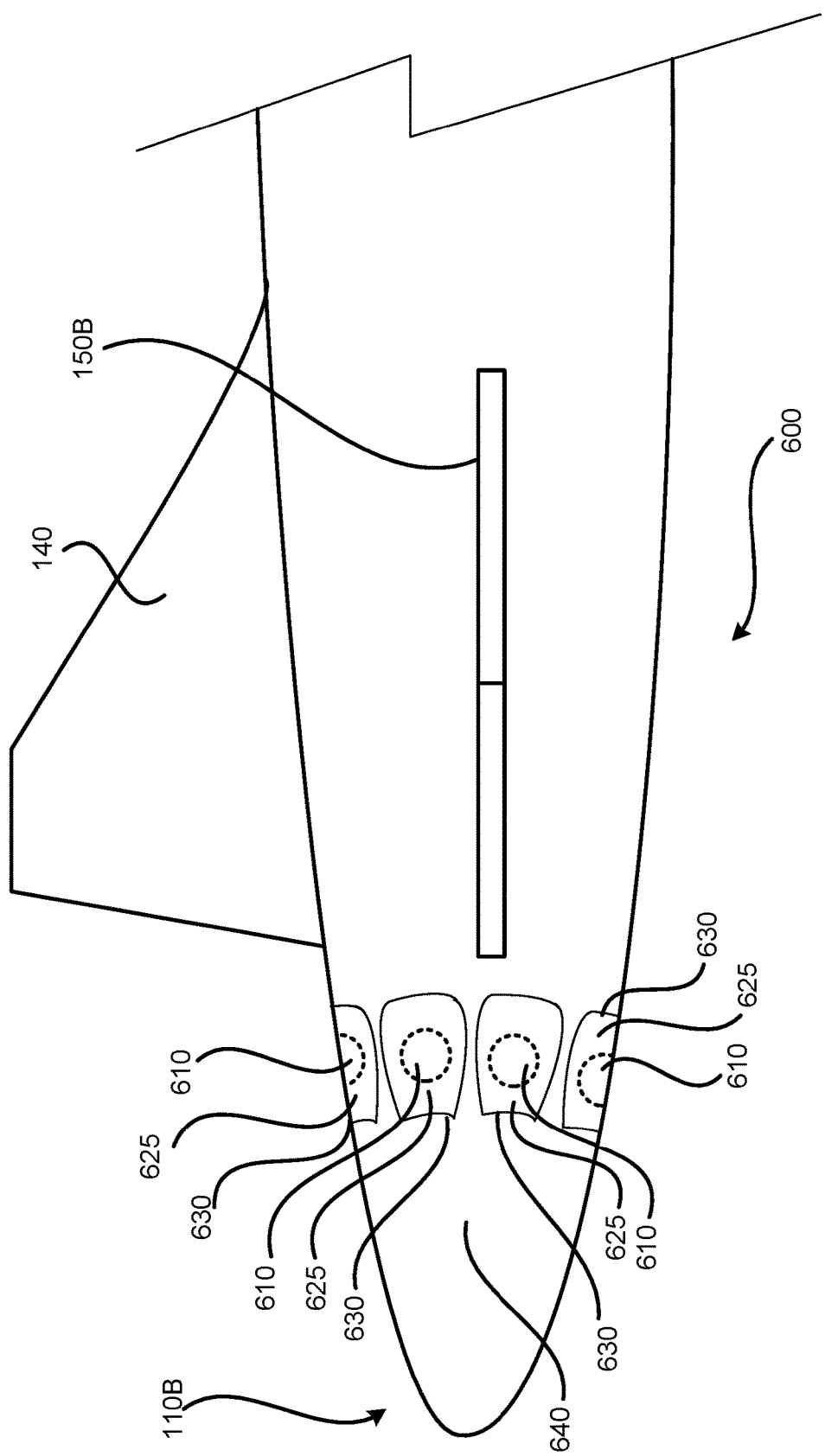
FIG. 6B is a side view of an aft portion of the example aircraft, illustrating the stowed state of the example plurality of auxiliary thrust fans shown in FIG. 6A.

FIG. 6A is a rear view, and FIG. 6B is a side view, of a portion of the example aircraft 100, and in particular, the aft end portion 110B of the main body 110 of the aircraft 100. The propulsion system 600 shown in FIGS. 6A-6E includes a main propulsion system 410 including a main propulsion source 414, in the form of the low bypass ratio engines 130 (not shown in the partial views provided in FIGS. 6A-6E), and an auxiliary propulsion system 460 including an auxiliary propulsion source 464 in the form of a plurality of auxiliary thrust fans 610. In the first mode of operation of the propulsion system 600, corresponding to, for example, high speed/supersonic cruise operation of the aircraft 100, the plurality of auxiliary thrust fans 610 are in a stowed state, in a space formed within an interior of the aft end portion 110B of the main body 110. A plurality of panels, or doors 630, may extend across a respective plurality of openings 625 formed in the outer skin 640 of the aft end portion 110B of the main body 110, respectively corresponding positions of the plurality of auxiliary thrust fans 610. In the stowed state, the plurality of panels, or doors 630, may be substantially flush with the exterior surface of the aft end portion 110B of the main body 110, such that the plurality of panels, or doors 630, define corresponding portions of the outer contour of the aft end portion 110B of the main body 110. In the stowed state, the plurality of auxiliary thrust fans 610 are confined within the aerodynamic profile of the aircraft 100, and do not extend out into the airflow path of the aircraft 100. Thus, in the stowed state, the auxiliary thrust fans 610 have little to no negative impact on cross-sectional area of the aft end portion 110B of the main body 110, and on overall performance of the aircraft 100.

Figure 6C:
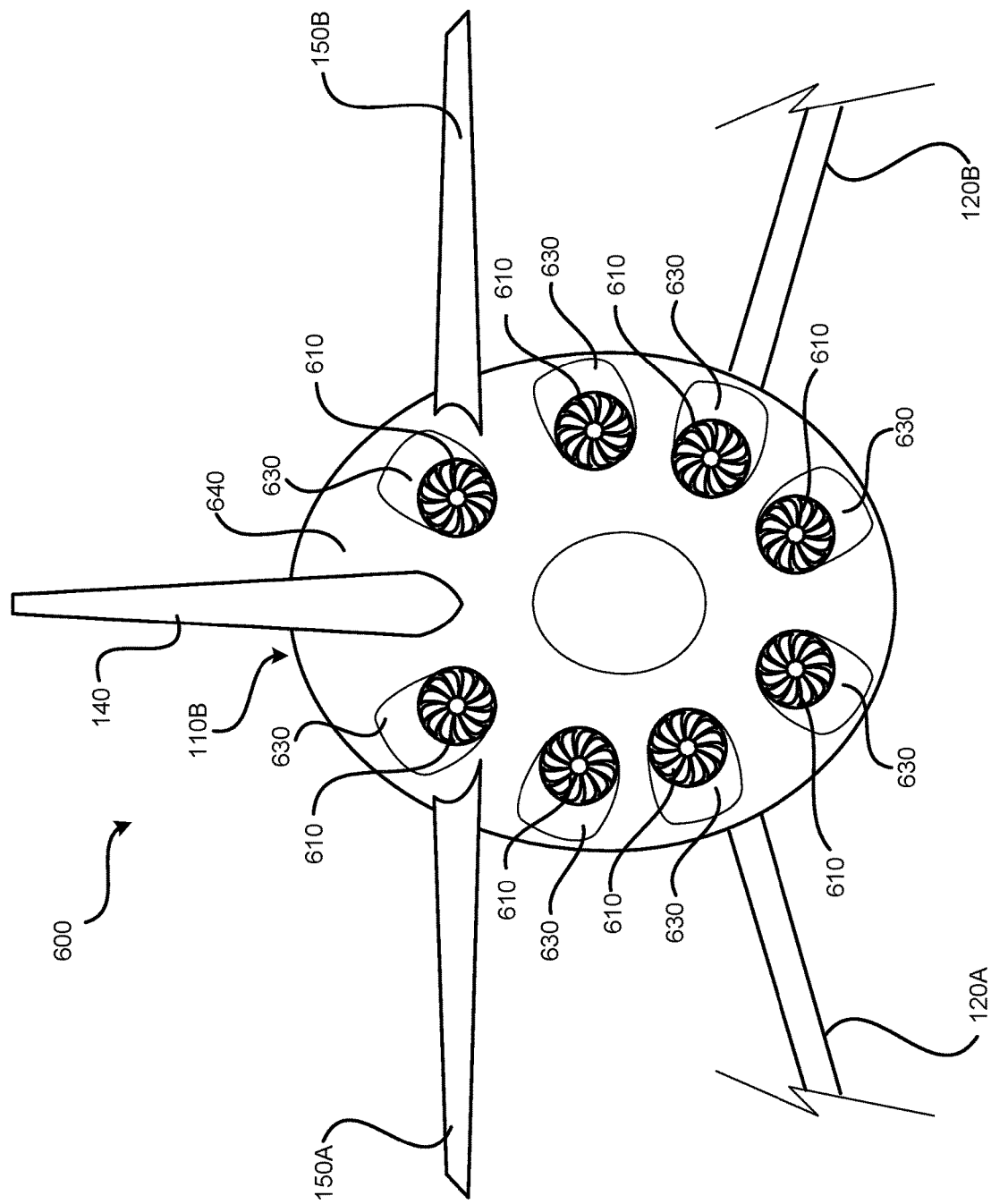
FIG. 6C is a rear view of the example aircraft, illustrating a deployed state of the example plurality of auxiliary thrust fans shown in FIGS. 6A and 6B.
Figure 6D:
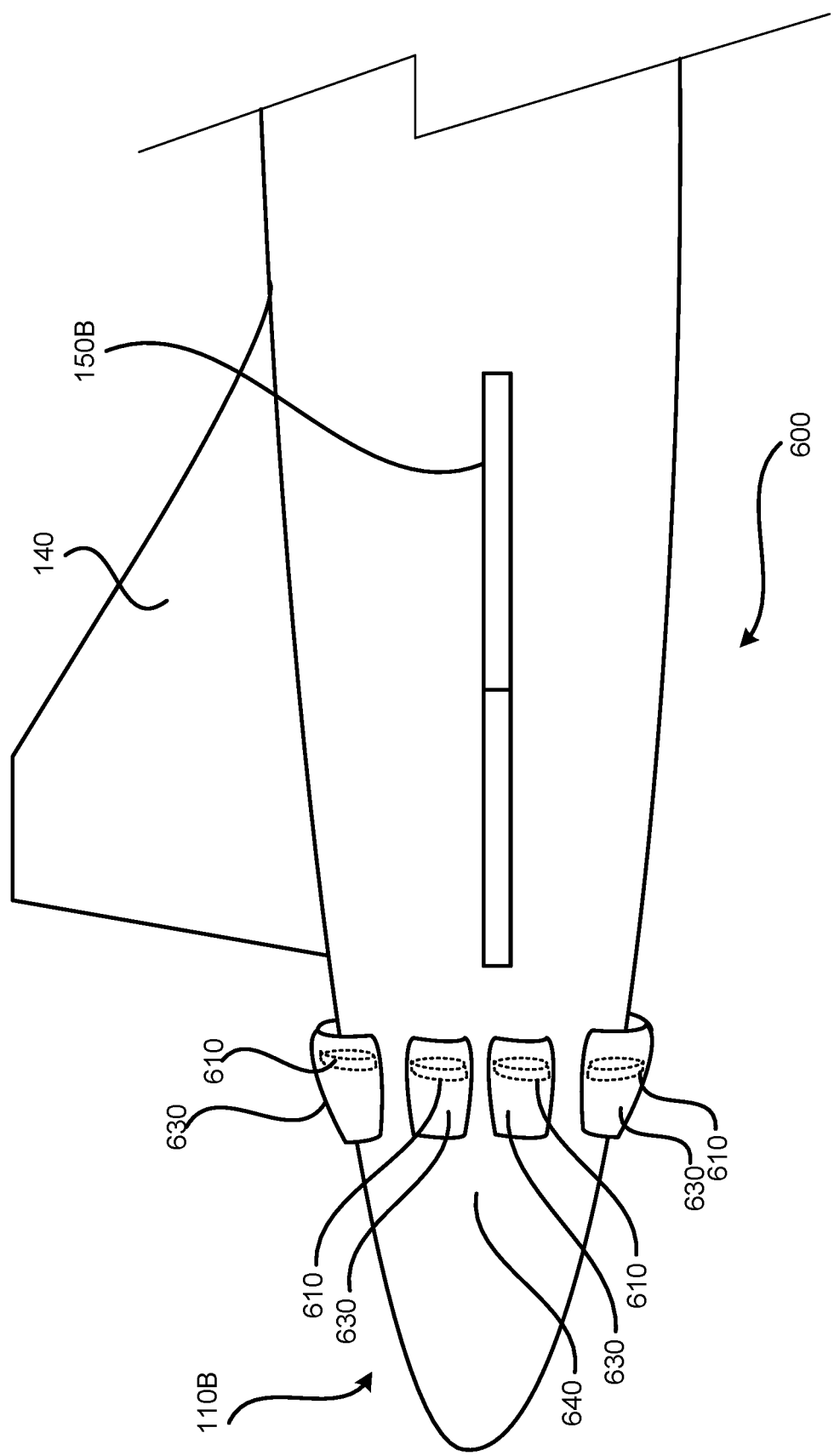
FIG. 6D is a side view of the aft portion of the example aircraft, illustrating the stowed state of the example plurality of auxiliary thrust fans shown in FIGS. 6A-6C.
Figure 6E:
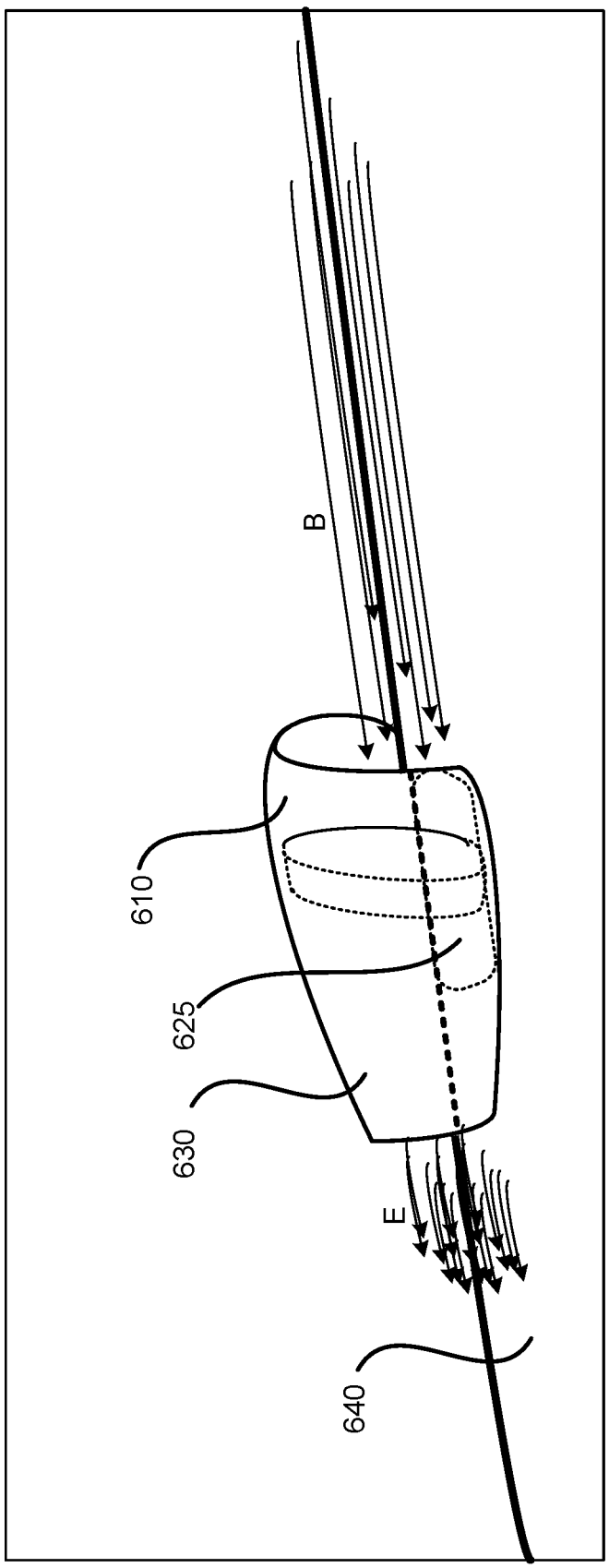
FIG. 6E is a close in view of one of the example plurality of auxiliary thrust fans shown in FIGS. 6A-6D, in the deployed state.

In some examples, the plurality of panels, or doors 630, may be movably coupled relative to the exterior surface of the aft end portion 110B of the main body 110. In the second mode of operation of the propulsion system 600, the plurality of auxiliary thrust fans 610 are in a deployed state, or an actuated state. FIG. 6C is a rear view of the aircraft 100, and FIG. 6D is a partial side view of the aircraft 100, illustrating the deployed state, or actuated state, of the plurality of auxiliary thrust fans 610. FIG. 6E is a close-in view illustrating the deployed state, or the actuated state, of one of the plurality of auxiliary thrust fans 610. In the deployed state, or actuated state, the plurality of panels, or doors 630, have moved relative to the outer skin 640 of the aft end portion 110B of the main body 110, allowing the plurality of auxiliary thrust fans 610 to be deployed outward through the respective plurality of openings 625.

In the example shown in FIGS. 6C-6E, the plurality of panels, or doors 630 are moved somewhat radially outward with respect to the longitudinal centerline A of the aircraft 100, and outward with respect to the outer skin 640 of the aft end portion 110B of the main body 110. In the deployed state, or actuated state, the plurality of auxiliary thrust fans 610 are arranged along the exterior surface of the aft end portion 110B of the main body 110, with the plurality of panels, or doors 630, forming shrouds, or cowlings, around the respective plurality of auxiliary thrust fans 610. In this arrangement, the plurality of auxiliary thrust fans 610 act as boundary layer ingestion fans. That is, as shown in FIG. 6E, boundary layer flow, identified by the arrows B, flows along the outer surface of the main body 110 of the aircraft 100. The boundary layer flow is ingested by the plurality of auxiliary thrust fans 610, and is discharged by the plurality of auxiliary thrust fans 610 as accelerated exhaust flow, identified by the arrows E. In some examples, the shrouding, or cowling, formed by the deployed state of the plurality of panels, or doors 630, may facilitate the guiding of the boundary layer flow into the plurality of auxiliary thrust fans 610, yielding more efficient production of propulsive force by the plurality of auxiliary thrust fans 610.

In some examples, an actuation mechanism (not shown in FIGS. 6A-6E), for example, an actuation mechanism of the actuation system 462 described above with respect to FIG. 4, may trigger movement of the plurality of panels, or doors 630, in this manner. Similarly, an actuation mechanism (not shown in FIGS. 6A-6E), for example, an actuation mechanism of the actuation system 462 described above with respect to FIG. 4, may trigger deployment of the plurality of auxiliary thrust fans 610, from the stowed state shown in FIGS. 6A and 6B (in which the plurality of auxiliary thrust fans 610 are in a standby state, and inoperable) to the deployed state, or actuated state, shown in FIGS. 6C-6E. Movement of the plurality of panels, or doors 630, and deployment of the plurality of auxiliary thrust fans 610, may be initiated by the propulsion control system 420 described above with respect to FIG. 4, in response to detection of a condition in which low speed operation of the aircraft 100, for example, in a take-off or landing situation and the like, in which it may be desirable to increase airflow capture area to reduce noise associated with operation of the aircraft 100.

As described above, in the first mode of operation, corresponding to high speed/supersonic cruise conditions, the plurality of auxiliary thrust fans 610 may be in the stowed state, within the interior of the aft end portion 110B of the main body 110, as shown in FIGS. 6A and 6B. In the stowed state, the plurality of auxiliary thrust fans 610 are contained within the aerodynamic profile of the aircraft 100, and have little to no negative impact on the cross-sectional area of the wing 120, and of the aircraft 100. Accordingly, in the first mode of operation, the plurality of auxiliary thrust fans 610 have little to no adverse impact on drag during high speed/supersonic cruise operation of the aircraft 100. In the first mode of operation, propulsion of the aircraft 100 is provided by the operation of the low bypass ratio engines 130, maintaining efficiency afforded by the low bypass ratio engines at high speed/supersonic cruise speed conditions.

In the second mode of operation of the propulsion system 600, in which increased airflow capture area may be beneficial, for example during low speed operation such as take-off or landing conditions, the plurality of auxiliary thrust fans 610 in the deployed state may be driven by power extracted from the low bypass ratio engines 130, via components of the auxiliary drive system 430 including the generating system 432 and the distribution system 434 described above with respect to FIG. 4. The driving of the plurality of auxiliary thrust fans 610 by electrical power extracted from the low bypass ratio engines 130 in this manner reduces an exit velocity from the low bypass ratio engines 130, thus reducing noise levels generated by operation of the low bypass ratio engines 130 at low speeds. Operation of the plurality of auxiliary thrust fans 610 (driven by the low bypass ratio engines 130) increases an overall airflow/mass flow capture area of the propulsion system 600, increasing the airflow/mass flow and thrust produced by the propulsion system 600 in the first mode, and compensating for the losses due to the lower speed operation of the low bypass ratio engines 130. Thus, the addition of the plurality of auxiliary thrust fans 610 during low speed operation, i.e., at take-off and/or landing, mimics the operation of higher bypass ratio engines, without the need to actually increase capture area of the main engines and incur the associated drag penalties during high speed/cruise operation.

The example arrangement shown in FIGS. 6A-6D illustrates a ring of eight auxiliary thrust fans 610, circumferentially arranged at the aft end portion 110B of the main body 110. In particular, the example arrangement shown in FIGS. 6A-6D includes the plurality of auxiliary thrust fans 610 arranged symmetrically along a circumferential surface of the aft end portion 110B of the main body 110, simply for purposes of discussion and illustration. The example propulsion system 600 can include more, or fewer, auxiliary thrust fans 610, arranged similarly (i.e., arranged in a ring along a circumferential surface), or differently than shown, for example, symmetrically, or asymmetrically. Further, the plurality of auxiliary thrust fans 610 may have different sizes and/or dimensions and/or flow capacities. Similarly, the plurality of auxiliary thrust fans 610 may be positioned differently than shown with respect to the vertical tail 140 and/or the horizontal tail 150.

In some examples, the plurality of auxiliary thrust fans 610 may be independently or dynamically controlled, to independently or dynamically vary exhaust velocity/thrust output by the individual auxiliary thrust fans 610. Independent, or dynamic control of the plurality of auxiliary thrust fans 610 may include, for example, independently or dynamically controlling a rotational speed of the individual auxiliary thrust fans 610. Independent, or dynamic control of the plurality of auxiliary thrust fans 610 may include independently or dynamically controlling operation of the auxiliary thrust fans 610 individually, so that some of the auxiliary thrust fans 610 are in the on-state, and some of the auxiliary thrust fans 610 are in the off-state or standby state at a particular time. Independent, or dynamic control of the plurality of auxiliary thrust fans 610 in this manner may allow the plurality of auxiliary thrust fans 610 to provide a thrust differential that can augment existing stability and control systems of the aircraft 100.

For example, operation of auxiliary thrust fans 610 positioned on one side of the aircraft 100 versus the other (for example, auxiliary thrust fans 610 positioned to one side of a vertical plane defined by the vertical tail 140 versus the other side of that vertical plane) may be dynamically controlled to augment or supplement the stability and control provided by the vertical tail 140. That is, dynamic control of the plurality of auxiliary thrust fans 610 to differentiate thrust generated across one side of the aircraft 100 versus the other may generate a yaw moment to supplement that which is provided by the vertical tail 140 to keep the aircraft within the desired line of flight. The supplemental control provided by the dynamic operational control of the plurality of auxiliary thrust fans 610 in this manner may allow for the use of a smaller vertical tail 140, thus providing potential savings in weight and drag. Similarly, dynamic control of auxiliary thrust fans 610 positioned at a top half versus a bottom half of the arrangement of the plurality of auxiliary thrust fans 610 may augment or supplement the stability and control provided by the horizontal tail 150. That is, dynamic control of the plurality of auxiliary thrust fans 610 to differentiate thrust generated across the top half versus the bottom half of the arrangement of the plurality of auxiliary thrust fans 610 may generate a pitching moment to supplement that which is provided by the horizontal tail 150 to keep the aircraft within the desired line of flight. This may allow for the use of a smaller horizontal tail 150, thus providing potential savings in weight and drag.

In some examples, some, or all, of the plurality of auxiliary thrust fans 610 may be gimbal mounted. Gimbal mounting may provide for directional control of the plurality of auxiliary thrust fans 610, either individually, or in subsets, or as a whole, to provide for further differentiation of thrust generated by the plurality of auxiliary thrust fans 610. Gimbal mounting of the plurality of auxiliary thrust fans 610 may further augment the capabilities of the existing stability and control systems of the aircraft 100.

FIGS. 7A-7E illustrate operation of an example propulsion system 700, in accordance with implementations described herein. Principles described above with respect to the propulsion system 400 shown in FIG. 4 may be applicable to the operation of the example propulsion system 700 shown in FIGS. 7A-7E.

Figure 7A:
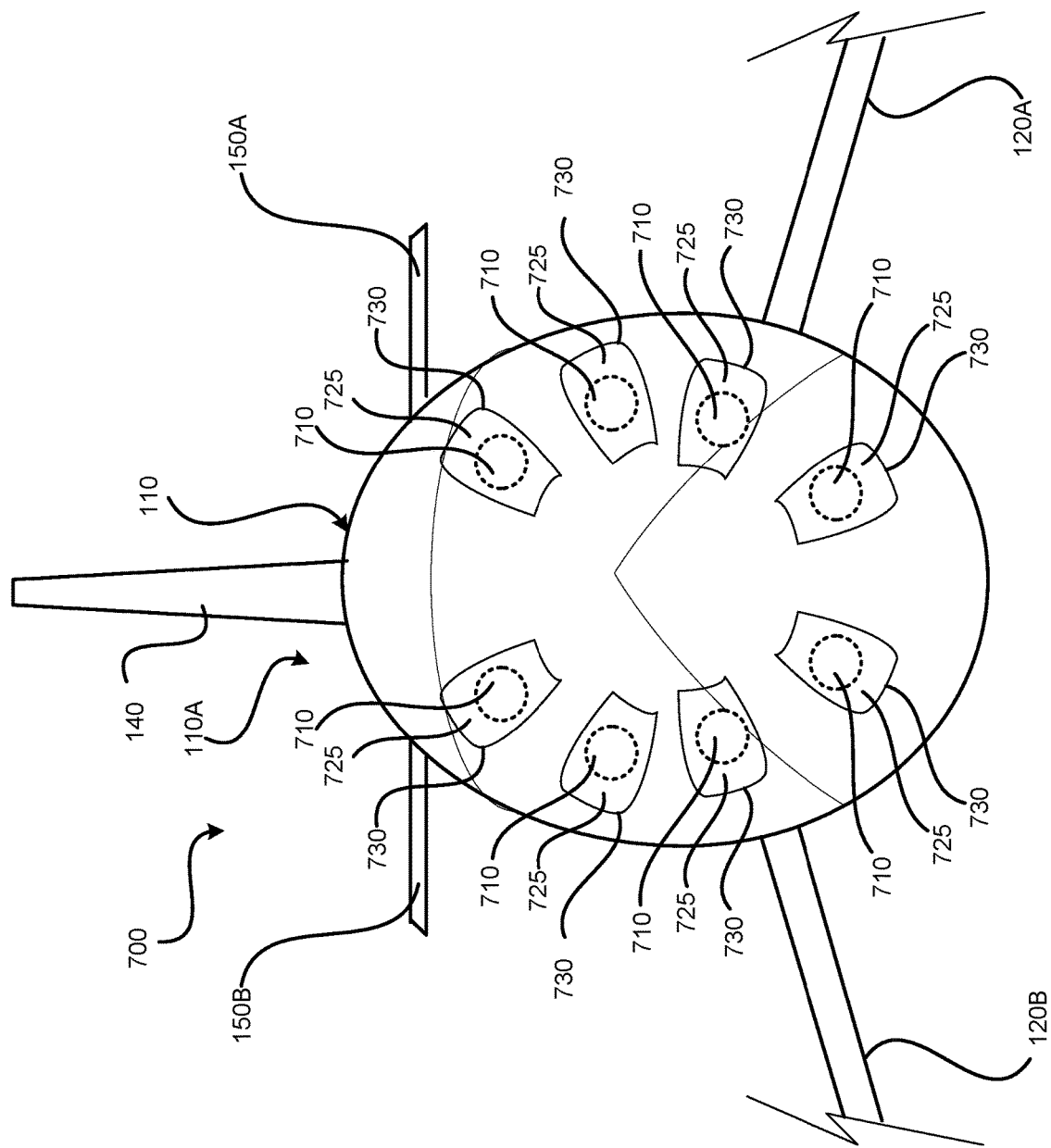
FIG. 7A is a front view of an example aircraft, illustrating a stowed state of an example plurality of auxiliary thrust fans of an example auxiliary propulsion system, in accordance with implementations described herein.
Figure 7B:
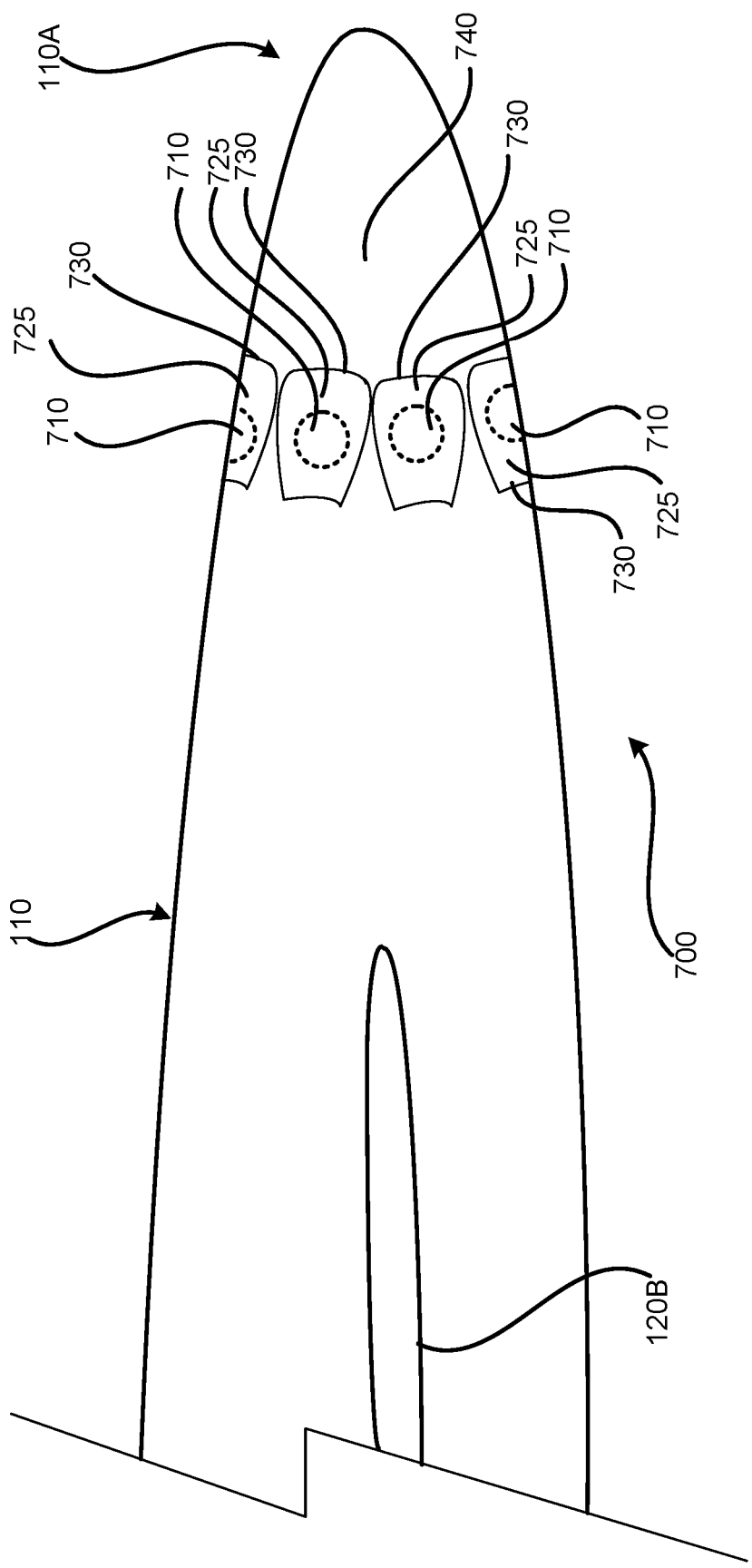
FIG. 7B is a side view of a forward portion of the example aircraft, illustrating the stowed state of the example plurality of auxiliary thrust fans shown in FIG. 7A.

FIG. 7A is a rear view, and FIG. 7B is a side view, of a portion of the example aircraft 100, and in particular, the forward end portion 110A of the main body 110 of the aircraft 100. The propulsion system 700 shown in FIGS. 7A-7E includes a main propulsion system 410 including a main propulsion source 414, in the form of the low bypass ratio engines 130 (not shown in the partial views provided in FIGS. 7A-7E), and an auxiliary propulsion system 460 including an auxiliary propulsion source 464 in the form of a plurality of auxiliary thrust fans 710. In the first mode of operation of the propulsion system 700, i.e., high speed/supersonic cruise operation of the aircraft 100, the plurality of auxiliary thrust fans 710 are in a stowed state, in a space formed within an interior of the forward end portion 110A of the main body 110. A plurality of panels, or doors 730, may extend across a respective plurality of openings 725 formed in the outer skin 740 of the forward end portion 110A of the main body 110, respectively corresponding positions of the plurality of auxiliary thrust fans 710. In the stowed state, the plurality of panels, or doors 730, may be substantially flush with the exterior surface of the forward end portion 110A of the main body 110, such that the plurality of panels, or doors 730, define corresponding portions of the outer contour of the forward end portion 110A of the main body 110. In the stowed state, the plurality of auxiliary thrust fans 710 are confined within the aerodynamic profile of the aircraft 100, and do not extend out into the airflow path of the aircraft 100. Thus, in the stowed state, the auxiliary thrust fans 710 have little to no negative impact on cross-sectional area of the forward end portion 110A of the main body 110, and of the aircraft 100.

Figure 7C:
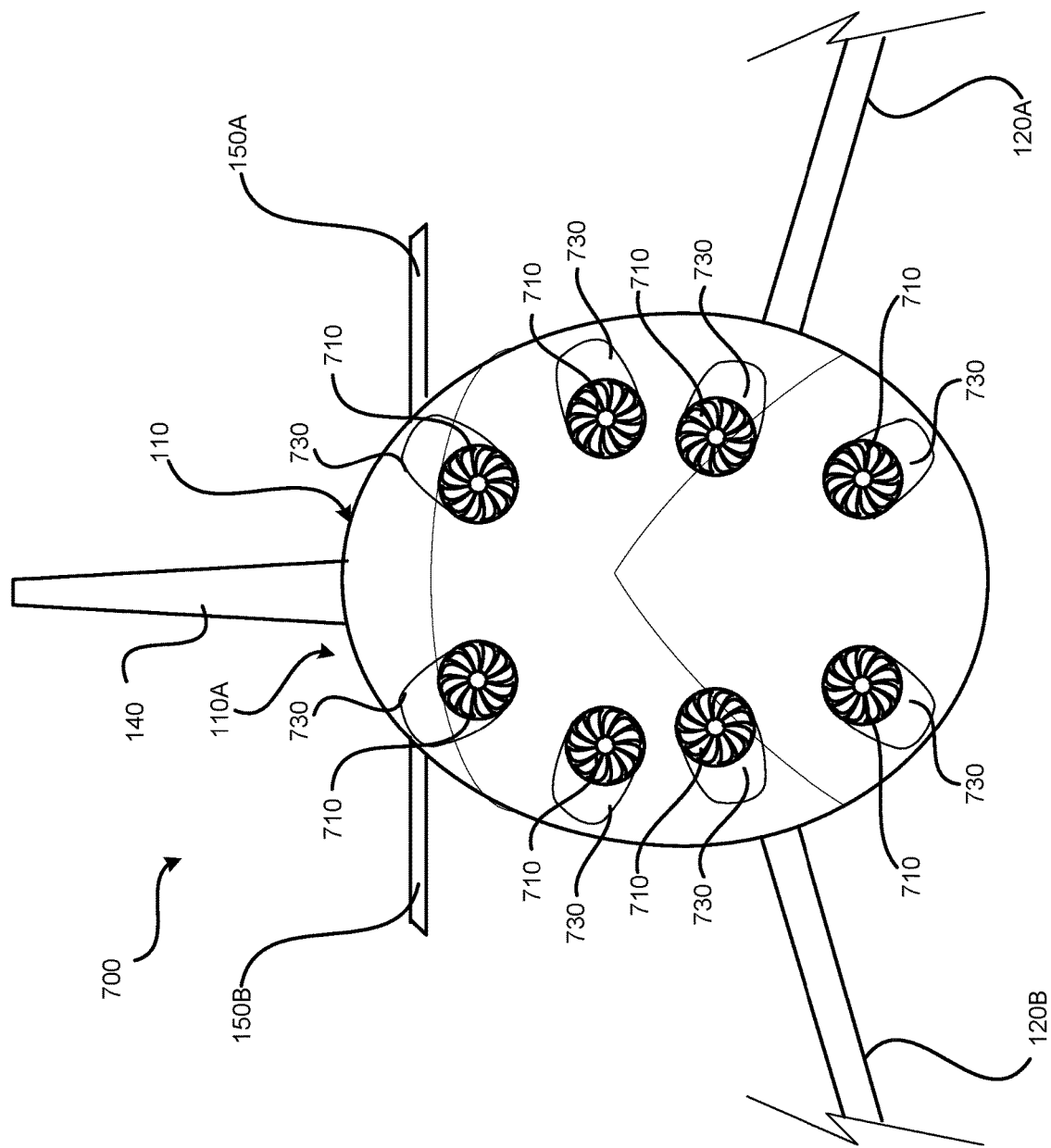
FIG. 7C is a front view of the example aircraft, illustrating a deployed state of the example plurality of auxiliary thrust fans shown in FIGS. 7A and 7B.
Figure 7D:
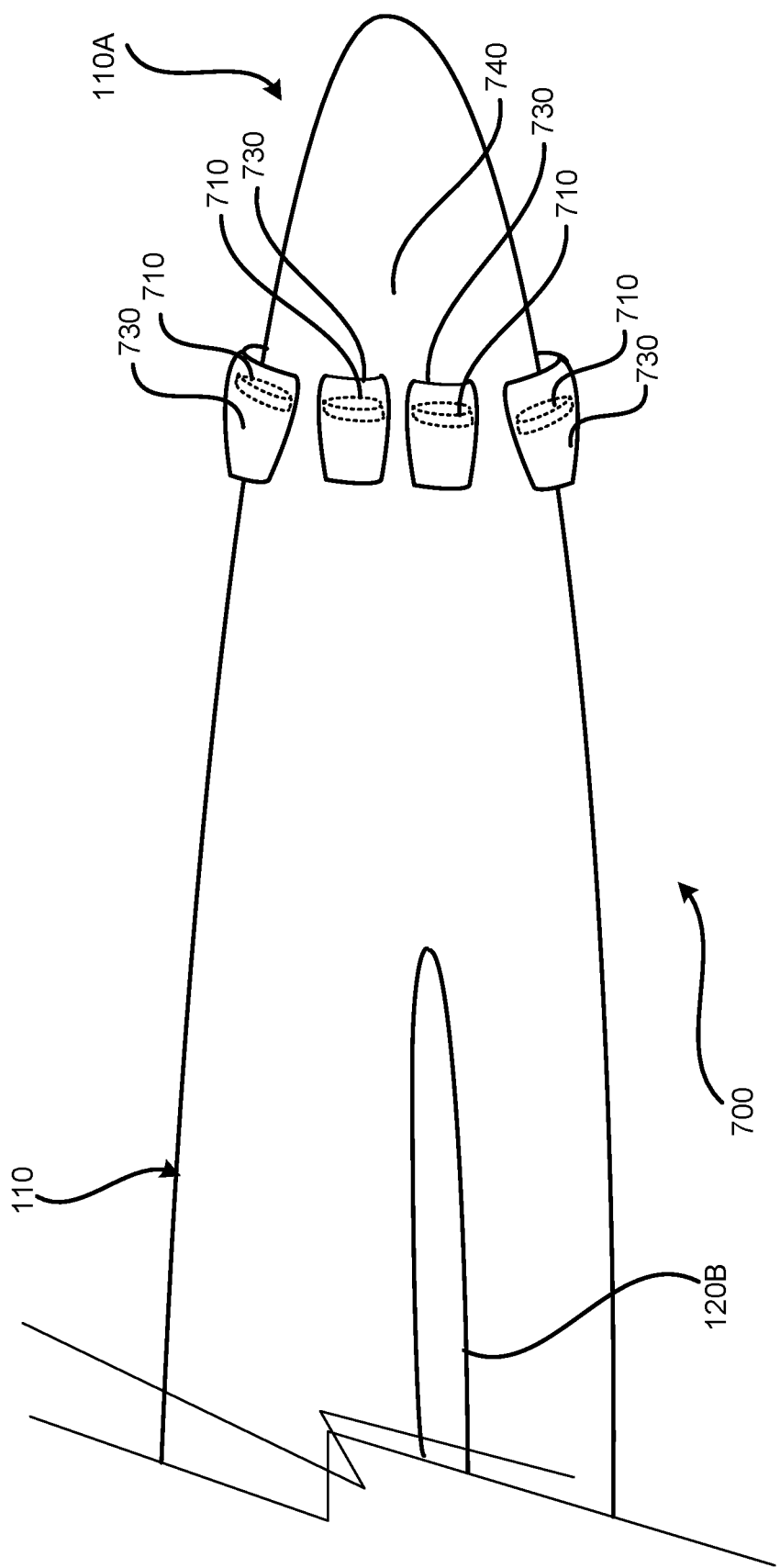
FIG. 7D is a side view of the forward portion of the example aircraft, illustrating the stowed state of the example plurality of auxiliary thrust fans shown in FIGS. 7A-7C.
Figure 7E:
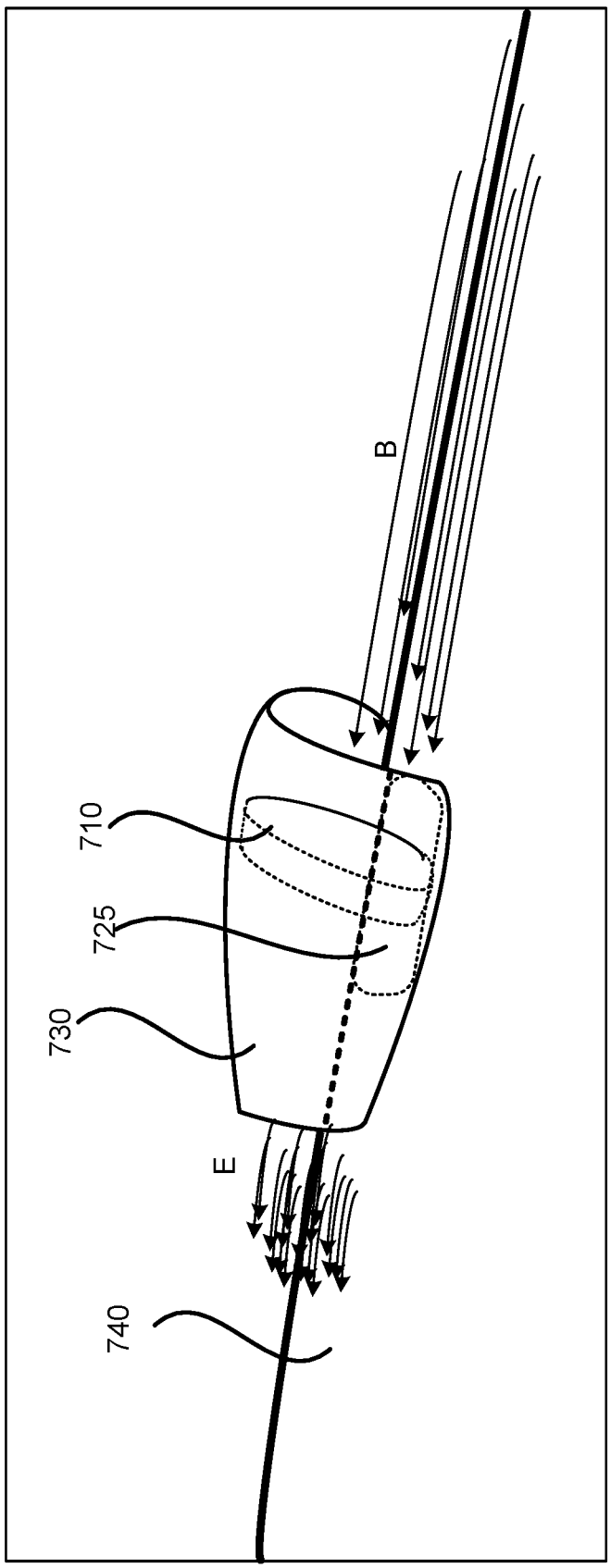
FIG. 7E is a close in view of one of the example plurality of auxiliary thrust fans shown in FIGS. 7A-7D, in the deployed state.

In some examples, the plurality of panels, or doors 730, may be movably coupled relative to the exterior surface of the forward end portion 110A of the main body 110. In the second mode of operation, the plurality of auxiliary thrust fans 710 are in a deployed state, or an actuated state. FIG. 7C is a front view of the aircraft 100, and FIG. 7D is a partial side view of the aircraft 100, illustrating the deployed state, or actuated state, of the plurality of auxiliary thrust fans 710. FIG. 7E is a close-in view illustrating the deployed state, or the actuated state, of one of the plurality of auxiliary thrust fans 710. In the deployed state, or actuated state, the plurality of panels, or doors 730, have moved relative to the outer skin 740 of the forward end portion 110A of the main body 110, allowing the plurality of auxiliary thrust fans 710 to be deployed outward through the respective plurality of openings 725.

In the example shown in FIGS. 7C-7E, the plurality of panels, or doors 730, are moved somewhat radially outward with respect to the longitudinal centerline A of the aircraft 100, and outward with respect to the outer skin 740 of forward end portion 110A of the main body 110. In the deployed state, or actuated state, the plurality of auxiliary thrust fans 710 are arranged along the exterior surface of the forward end portion 110A of the main body 110, with the plurality of panels, or doors 730, forming shrouds, or cowlings, around the respective plurality of auxiliary thrust fans 710. In this arrangement, the plurality of auxiliary thrust fans 710 act as boundary layer ingestion fans. That is, as shown in FIG. 7E, boundary layer flow, identified by the arrows B, flows along the outer surface of the main body 110 of the aircraft 100. The boundary layer flow is ingested by the plurality of auxiliary thrust fans 710, and is discharged by the plurality of auxiliary thrust fans 710 as accelerated exhaust flow, identified by the arrows E. In some examples, the shrouding, or cowling, formed by the deployed state of the plurality of panels, or doors 730, may facilitate the guiding of the boundary layer flow into the plurality of auxiliary thrust fans 710, yielding more efficient production of propulsive force by the plurality of auxiliary thrust fans 710.

In some examples, an actuation mechanism (not shown in FIGS. 7A-7E), for example, an actuation mechanism of the actuation system 462 described above with respect to FIG. 4, may cause movement of the plurality of panels, or doors 730, in this manner. Similarly, an actuation mechanism (not shown in FIGS. 7A-7E), for example, an actuation mechanism of the actuation system 462 described above with respect to FIG. 4, may cause deployment of the plurality of auxiliary thrust fans 710, from the stowed state shown in FIGS. 7A and 7B to the deployed state, or actuated state, shown in FIGS. 7C-7E. Movement of the plurality of doors 730, and deployment of the plurality of auxiliary thrust fans 710, may be initiated by the propulsion control system 420 described above with respect to FIG. 4, in response to detection of low speed operation of the aircraft 100, for example, in a take-off or landing situation and the like, in which it may be desirable to increase airflow capture area to reduce noise associated with operation of the aircraft 100.

As described above, in the first mode of operation, corresponding to high speed/supersonic cruise conditions, the plurality of auxiliary thrust fans 710 may be in the stowed state, within the interior of the forward end portion 110A of the main body 110, as shown in FIGS. 7A and 7B. In the stowed state, the plurality of auxiliary thrust fans 710 are contained within the aerodynamic profile of the aircraft 100, and have little to no negative impact on the cross-sectional area of the forward end portion 110A of the main body 110, and of the aircraft 100 overall. Accordingly, in the first mode of operation, the plurality of auxiliary thrust fans 710 have little to no adverse impact on drag during high speed/supersonic cruise operation of the aircraft 100. In the first mode of operation, propulsion of the aircraft 100 is provided by the operation of the low bypass ratio engines 130, maintaining efficiency afforded by the low bypass ratio engines at high speed/supersonic cruise speed conditions.

In the second mode of operation, corresponding to conditions that would benefit from increased airflow capture areas, including low speed operation such as take-off or landing conditions, the plurality of auxiliary thrust fans 710 may be transitioned from the stowed state to the deployed state, or actuated state, shown in FIGS. 7C-7E. In the deployed state, the plurality of auxiliary thrust fans 710 may be driven, via components of the auxiliary drive system 430 including the generating system 432 and the distribution system 434 described above with respect to FIG. 4, by the low bypass ratio engines 130. The driving of the plurality of auxiliary thrust fans 710 by power extracted from the low bypass ratio engines 130 in this manner reduces an exit velocity from the low bypass ratio engines 130, thus reducing noise levels generated by operation of the low bypass ratio engines 130 at low speeds. Operation of the plurality of auxiliary thrust fans 710 (driven by the low bypass ratio engines 130) increases an overall airflow/mass flow capture area of the propulsion system 700, increasing the airflow/mass flow and thrust produced by the propulsion system 700 in the first mode, and compensating for the losses due to the lower speed operation of the low bypass ratio engines 130. Thus, the addition of the plurality of auxiliary thrust fans 710 during low speed operation, i.e., at take-off and/or landing, mimics the operation of higher bypass ratio engines, without the need to actually increase capture area of the main engines and incur the associated drag penalties during high speed/cruise operation.

The example arrangement shown in FIGS. 7A-7D illustrates a ring of eight auxiliary thrust fans 710, circumferentially arranged at the forward end portion 110A of the main body 110. In particular, the example arrangement shown in FIGS. 7A-7D includes the plurality of auxiliary thrust fans 710 arranged symmetrically along a circumferential surface of the forward end portion 110A of the main body 110, simply for purposes of discussion and illustration. In some examples, the example propulsion system 700 can include more, or fewer, auxiliary thrust fans 710, arranged similarly (i.e., arranged in a ring along a circumferential surface), or differently that shown, for example, symmetrically, or asymmetrically. Further, the plurality of auxiliary thrust fans 710 may have different sizes and/or dimensions and/or capacities. Similarly, the plurality of auxiliary thrust fans 610 may be positioned differently than shown with respect to the nose of the aircraft 100, the wings 120, and the like.

As with the plurality of auxiliary thrust fans 610 described above with respect to FIGS. 6A-6E, the plurality of auxiliary thrust fans 710 may be independently, or dynamically controlled, to dynamically vary exhaust velocity/thrust output by the individual auxiliary thrust fans 710. Independent, or dynamic control of the plurality of auxiliary thrust fans 610 to provide for differentiated, or varying thrust may include, for example, dynamically controlling a rotational speed and/or an on/off state of the individual auxiliary thrust fans 710, and the like. Independent, or dynamic control of the plurality of auxiliary thrust fans 710 in this manner may allow the plurality of auxiliary thrust fans 710 to generate a thrust differential that can augment existing stability and control systems of the aircraft 100. For example, dynamic control of auxiliary thrust fans 710 positioned on one side of the aircraft 100 versus the other may generate a thrust differential that can augment or supplement the stability and control provided by the vertical tail 140, thus allowing for the use of a smaller vertical tail 140, and providing potential savings in weight and drag. Similarly, dynamic control of auxiliary thrust fans 710 positioned at a top half versus a bottom half of the arrangement of the plurality of auxiliary thrust fans 710 may augment or supplement the stability and control provided by the horizontal tail 150, thus allowing for the use of a smaller horizontal tail 150, and providing potential savings in weight and drag. Like the plurality of auxiliary thrust fans 610, some, or all, of the plurality of auxiliary thrust fans 710 may be gimbal mounted. Gimbal mounting may provide for directional control of the plurality of auxiliary thrust fans 710, either individually, or in subsets, or as a whole, to provide for further differentiation of thrust generated by the plurality of auxiliary thrust fans 710, alone or in combination with the plurality of auxiliary thrust fans 610. Gimbal mounting of the plurality of auxiliary thrust fans 710 may further augment the capabilities of the existing stability and control systems of the aircraft 100.

Figure 8B:
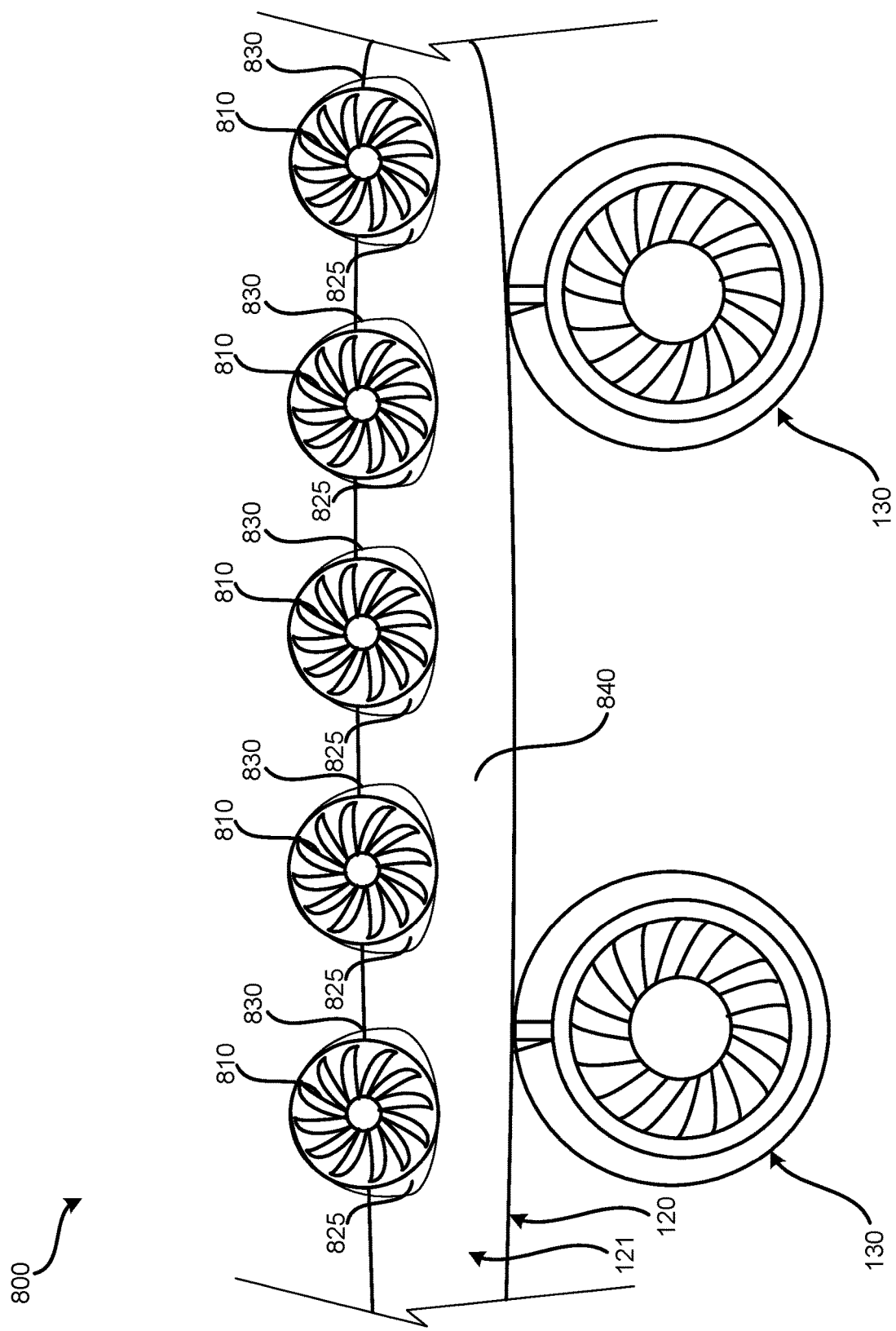
FIG. 8B is a partial front view of the example wing, illustrating a deployed state of the example plurality of auxiliary thrust fans shown in FIG. 8A.
Figure 8C:
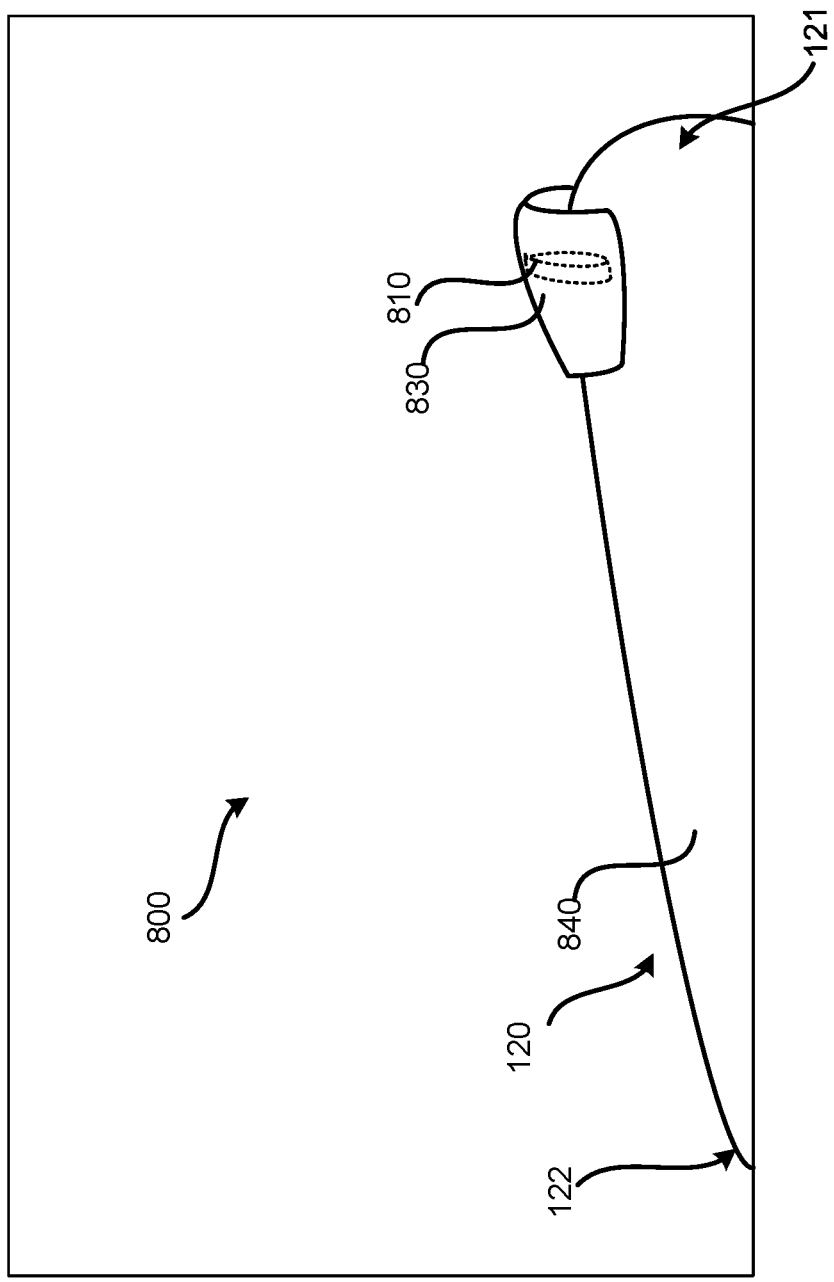
FIG. 8C is a side view of a portion of the example wing, illustrating the deployed state of one of the example plurality of auxiliary thrust fans shown in FIGS. 8A and 8B.

FIGS. 8A-8C illustrate operation of an example propulsion system 800, in accordance with implementations described herein. Principles described above with respect to the propulsion system 400 shown in FIG. 4 may be applicable to the operation of the example propulsion system 800 shown in FIGS. 8A-8C. FIGS. 8A-8C illustrate a portion of one of the pair of wings 120 (the first wing 120A and/or the second wing 120B), simply for ease of discussion and illustration. The principles to be described herein may be applied to systems provided in the first wing 120A and/or systems provided in the second wing 120B.

FIG. 8A is a front view of the wing 120, as viewed from the leading edge portion 121 of the wing. The propulsion system 800 shown in FIGS. 8A-8C includes a main propulsion system 410 including a main propulsion source 414, in the form of the low bypass ratio engines 130, and an auxiliary propulsion system 460 including an auxiliary propulsion source 464 in the form of a plurality of auxiliary thrust fans 810. In the first mode of operation of the propulsion system 800, i.e., high speed/supersonic cruise operation of the aircraft 100, the plurality of auxiliary thrust fans 810 are in a stowed state, received within an interior space defined by an outer skin 840 of the wing 120, as shown in FIG. 8A. A plurality of panels, or doors 830, may extend across a respective plurality of openings 825 formed in the outer skin 840 of the wing 120, respectively corresponding to installation positions of the plurality of auxiliary thrust fans 810. In the stowed state of the plurality of auxiliary thrust fans 810, the plurality of panels, or doors 830, may be substantially flush with the outer skin 840 of the wing 120, such that the plurality of doors 830 define corresponding portions of the outer contour of the wing 120. In the stowed state, the plurality of auxiliary thrust fans 810 are confined within the aerodynamic profile of the aircraft 100, and do not extend out into the airflow path of the aircraft 100. Thus, in the stowed state, the plurality of auxiliary thrust fans 810 have little to no negative impact on cross-sectional area of the wing 120, and of the aircraft 100.

In some examples, the plurality of panels, or doors 830, may be movably coupled relative to the exterior surface of the wing 120. In the second mode of operation, the plurality of auxiliary thrust fans 810 are in a deployed state, or an actuated state. FIG. 8B is a front view of wing 120, illustrating the deployed state, or actuated state, of the plurality of auxiliary thrust fans 810. FIG. 8C is a close-in side view illustrating the deployed state, or the actuated state, of one of the plurality of auxiliary thrust fans 810. In the deployed state, or actuated state, the plurality of panels, or doors 830 have moved relative to the outer skin 840 of the wing 120, allowing the plurality of auxiliary thrust fans 810 to be deployed outward through the respective plurality of openings 825.

In the deployed state, or actuated state, the plurality of auxiliary thrust fans 810 are arranged along the leading edge portion 121 of the wing 120, with the plurality of doors 830, or panels, forming shrouds, or cowlings, around the respective plurality of auxiliary thrust fans 810. In this arrangement, the plurality of auxiliary thrust fans 810 may act as boundary layer ingestion fans, ingesting boundary layer flow across the leading edge portion 121 of the wing 120 and discharging accelerated exhaust flow. In some examples, the shrouding, or cowling, formed by the deployed state of the plurality of panels, or doors 830, may facilitate the guiding of airflow into the plurality of auxiliary thrust fans 810, yielding more efficient production of propulsive force by the plurality of auxiliary thrust fans 810.

In some examples, an actuation mechanism (not shown in FIGS. 8A-8C), for example, an actuation mechanism of the actuation system 462 described above with respect to FIG. 4, may cause movement of the plurality of panels, or doors 830, in this manner. Similarly, an actuation mechanism (not shown in FIGS. 7A-7E), for example, an actuation mechanism of the actuation system 462 described above with respect to FIG. 4, may cause deployment of the plurality of auxiliary thrust fans 810, from the stowed state shown in FIG. 8A to the deployed state, or actuated state, shown in FIGS. 8B and 8C. Movement of the plurality of doors 830, and deployment of the plurality of auxiliary thrust fans 810, may be initiated by the propulsion control system 420 described above with respect to FIG. 4, in response to detection of low speed operation of the aircraft 100, for example, in a take-off or landing situation, and the like, in which it may be desirable to increase airflow capture area to reduce noise associated with operation of the aircraft 100.

As described above, in the first mode of operation, corresponding to high speed/supersonic cruise conditions, with the plurality of auxiliary thrust fans 810 in the stowed state within the interior of the wing 120, the plurality of auxiliary thrust fans 810 are contained within the aerodynamic profile of the aircraft 100, and have little to no negative impact on the cross-sectional area of the wing 120, and of the aircraft 100 overall. Accordingly, in the first mode of operation, the plurality of auxiliary thrust fans 810 have little to no adverse impact on drag during high speed/supersonic cruise operation of the aircraft 100. In the first mode of operation, propulsion of the aircraft 100 is provided by the operation of the low bypass ratio engines 130, maintaining efficiency afforded by the low bypass ratio engines at high speed/supersonic cruise speed conditions.

In the second mode of operation, corresponding to conditions in which increased airflow capture area may be beneficial, including low speed operation such as take-off or landing conditions, the plurality of auxiliary thrust fans 810, in the deployed state, may be driven by the low bypass ratio engines 130, via components of the auxiliary drive system 430 including the generating system 432 and the distribution system 434 described above with respect to FIG. 4. The driving of the plurality of auxiliary thrust fans 810 by power extracted from the low bypass ratio engines 130 in this manner reduces an exit velocity from the low bypass ratio engines 130, thus reducing noise levels generated by operation of the low bypass ratio engines 130 at low speeds. Operation of the plurality of auxiliary thrust fans 810 (driven by the low bypass ratio engines 130) increases an overall airflow/mass flow capture area of the propulsion system 800, increasing the airflow/mass flow and thrust produced by the propulsion system 800 in the first mode, and compensating for the losses due to the lower speed operation of the low bypass ratio engines 130. Thus, the addition of the plurality of auxiliary thrust fans 810 during low speed operation, i.e., at take-off and/or landing, mimics the operation of higher bypass ratio engines, without the need to actually increase capture area of the main engines and incur the associated drag penalties during high speed/cruise operation.

As with the plurality of auxiliary thrust fans 610 described above with respect to FIGS. 6A-6E and the plurality of auxiliary thrust fans 710 described above with respect to FIGS. 7A-7E, operation of the plurality of auxiliary thrust fans 810 may be dynamically controlled, to dynamically vary exhaust velocity/thrust output by the individual auxiliary thrust fans 810. Dynamic control of the plurality of auxiliary thrust fans 610 to provide for differentiated, or varying thrust may include, for example, dynamically controlling a rotational speed and/or an on/off state of the individual auxiliary thrust fans 810, and the like. Dynamic control of the plurality of auxiliary thrust fans 810 in this manner may allow the plurality of auxiliary thrust fans 810 to generate a thrust differential that can augment existing stability and control systems of the aircraft 100. For example, dynamic control of auxiliary thrust fans 810 positioned on the first wing 120A versus the second wing 120B may generate a thrust differential that can augment or supplement the stability and control provided by the vertical tail 140, thus allowing for the use of a smaller vertical tail 140, and providing potential savings in weight and drag. Like the plurality of auxiliary thrust fans 610, and the plurality of auxiliary thrust fans 710, in some examples, the plurality of auxiliary thrust fans 810 may be gimbal mounted. Gimbal mounting may provide for directional control (individually, or as a grouping) of thrust generated by the plurality of auxiliary thrust fans 810, further augmenting the existing stability and control systems of the aircraft 100.

The plurality of auxiliary thrust fans 610 have been described at an installation position proximate the aft end portion 110B of the main body 110 of the aircraft 100, simply for purposes of discussion and illustration. Similarly, the plurality of auxiliary thrust fans 710 have been described at an installation position proximate the forward end portion 110A of the main body 110 of the aircraft 100, and the plurality of auxiliary thrust fans 810 have been described at an installation position proximate the leading edge portion of one or both of the wings 120, simply for purposes of discussion and illustration. The principles described herein may be applied to other arrangements of auxiliary thrust fans provided at other portions of the aircraft 100, to function as boundary layer ingestion fans as described above.

In some examples, a propulsion system may include the one or more auxiliary thrust fan(s) 310 (described above with respect to FIGS. 3A-3C) and/or the auxiliary thrust fan 510 (described above with respect to FIGS. 5A-5C) and/or the auxiliary thrust fans 610 (described above with respect to FIGS. 6A-6E) and/or the auxiliary thrust fans 710 (described above with respect to FIGS. 7A-7E) and/or the auxiliary thrust fans 810 (described above with respect to FIGS. 8A-8C), used alone, or in combination with each other, in a particular aircraft. In some examples, a combination of auxiliary thrust fans may be incorporated into a particular aircraft based on, for example, aircraft configuration, anticipated operational conditions, capabilities of the main propulsion system (i.e., the main engines) and other such factors. In some examples, some, or all, of the auxiliary thrust fans may be mechanically driven by the main propulsion system, as described above with respect to FIG. 2. In some examples, some, or all, of the auxiliary thrust fans may be electrically driven by the main propulsion system, as described above with respect to FIG. 4. In some examples, some of the auxiliary thrust fans may be mechanically driven, and some of the auxiliary thrust fans may be electrically driven.

In an example in which the one or more auxiliary thrust fan(s) described above is electrically driven by power extracted from one or more of the low bypass ratio engines 130, electrical power that is generated by the generating system 432, but is not consumed by operation of the auxiliary thrust fan(s), may be stored in the power storage device 436 for later use. In some examples, the distribution system 434 of the auxiliary drive system may be configured such that electrical power stored in the power storage device 436 may be available for use by other systems of the aircraft 100.

Figure 9:
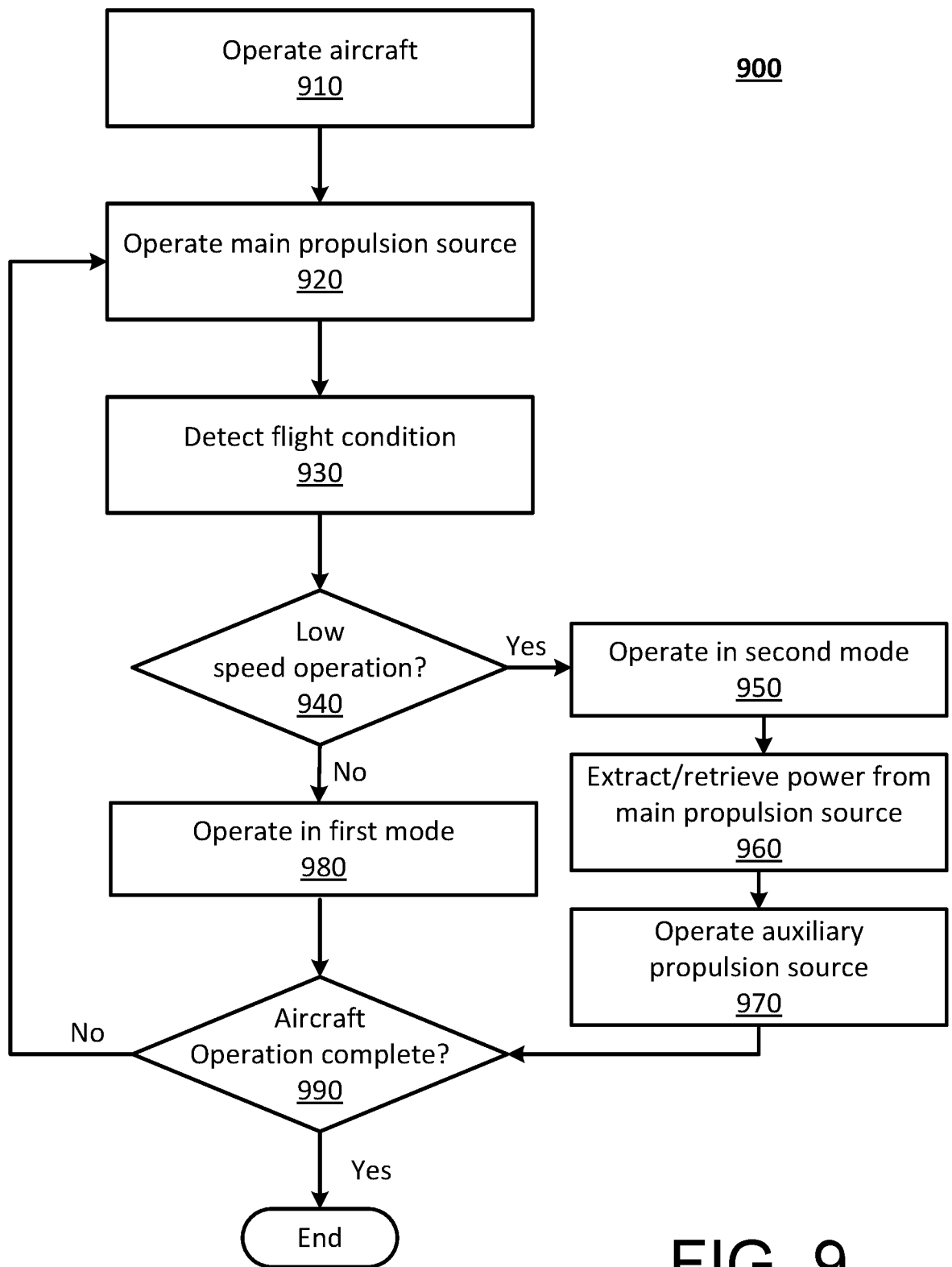
FIG. 9 is a flowchart of a process, in accordance with implementations described herein.

FIG. 9 is a flowchart of a method 900, in accordance with example implementations described herein. The method may be applied to the operation of one or more of the propulsion systems described herein. Operation of an aircraft may be initiated (block 910) including operation of a main propulsion source of a propulsion system of the aircraft (block 920). The propulsion system may include the main propulsion source and an auxiliary propulsion source. The main propulsion source may include one or more high bypass ratio engines, such as the high bypass ratio turbojet engines described above. The auxiliary propulsion system may include one or more auxiliary thrust fans, provided at a variety of locations on the aircraft, such as the various auxiliary thrust fans described above. An operational/flight condition of the aircraft may be detected (block 930). If it is determined that the aircraft is in a high speed operation condition, i.e., not in a low speed operation condition (block 940), the propulsion system may operate in a first mode (block 980). In the first mode, the main propulsion source may provide propulsive power for flight of the aircraft, while the auxiliary propulsion source remains stowed and idle. If it is determined that the aircraft is in a low speed operation condition (block 940), the propulsion system may operate in a second mode (block 950). In the second mode, power may be extracted from the main propulsion source, to provide power to the auxiliary power source (block 960). In some examples, power is extracted via a mechanical coupling of the auxiliary propulsion source and the main propulsion source. In some examples, power is extracted via an electrical coupling of the auxiliary propulsion source and the main propulsion source. The auxiliary power source is operated, together with the main propulsion source (block 970) until it is determined that operation of the aircraft is complete (block 990).

A number of embodiments have been described. Nevertheless, it will be understood that various modifications may be made without departing from the spirit and scope of the specification.

Logic flows depicted in the figures, if any, do not require the particular order shown, or sequential order, to achieve desirable results. In addition, other steps may be provided, or steps may be eliminated, from the described flows, and other components may be added to, or removed from, the described systems.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An aircraft, comprising:
an aircraft structure; and
a propulsion system operably coupled in the aircraft structure, the propulsion system having a variable airflow capture area, the propulsion system including:
at least one jet engine mounted to the aircraft structure;
at least one auxiliary thrust fan coupled in the aircraft structure, wherein
in a first mode,
the propulsion system has a first airflow capture area,
the at least one jet engine provides power to the aircraft, and
the at least one auxiliary thrust fan is in a standby state, stowed within an aerodynamic profile of the aircraft structure; and
in a second mode,
the propulsion system has a second airflow capture area that is greater than the first airflow capture area, and
the at least one auxiliary thrust fan is in a deployed state and is driven by power extracted from the at least one jet engine, further wherein
an exhaust velocity of the at least one jet engine in the second mode is less than the exhaust velocity of the at least one jet engine in the first mode as power is extracted from the at least one jet engine to drive the at least one auxiliary thrust fan; and
a noise level output by the at least one jet engine in the second mode is less that the noise level output by the at least one jet engine in the first mode.

2. The aircraft of claim 1, wherein
the first mode corresponds to a supersonic operation mode of the aircraft; and
the second mode corresponds to a low speed operation mode of the aircraft.

3. The aircraft of claim 1, wherein the at least one auxiliary thrust fan is mechanically coupled to and driven by the at least one jet engine in the second mode.

4. The aircraft of claim 1, wherein the at least one auxiliary thrust fan is electrically coupled to and driven by the at least one jet engine in the second mode.

5. The aircraft of claim 1, wherein
the at least one jet engine comprises at least one low bypass ratio turbojet engine configured to generate thrust to support supersonic cruise operation of the aircraft; and
the at least one auxiliary thrust fan comprises a plurality of auxiliary thrust fans.

6. The aircraft of claim 5, wherein
the first airflow capture area is defined by a capture area of the at least one low bypass ratio turbojet engine; and
the second airflow capture area is defined by an airflow capture area of the plurality of auxiliary thrust fans together with the capture area of the at least one low bypass ratio turbojet engine.

7. The aircraft of claim 1, wherein the at least one auxiliary thrust fan comprises a plurality of auxiliary thrust fans arranged circumferentially along an aft end portion of a main body of the aircraft structure.

8. The aircraft of claim 1, wherein the at least one auxiliary thrust fan comprises a plurality of auxiliary thrust fans arranged circumferentially along a forward end portion of a main body of the aircraft structure.

9. The aircraft of claim 1, wherein the at least one auxiliary thrust fan comprises a first plurality of auxiliary thrust fans arranged along a leading edge portion of a first wing of the aircraft structure, and a second plurality of auxiliary thrust fans arranged along a leading edge portion of a second wing of the aircraft structure.

10. The aircraft of claim 1, further comprising a drive system coupled between the at least one jet engine and the at least one auxiliary thrust fan, the drive system comprising:
a generating system operably coupled to the at least one jet engine, wherein the generating system is configured to generate electric power from power extracted during operation of the at least one jet engine; and
a distribution system configured to selectively distribute the electric power generated by the generating system to the at least one auxiliary thrust fan to drive the at least one auxiliary thrust fan during operation in the second mode.

11. The aircraft of claim 10, wherein the drive system includes a power storage device configured to store electric power generated by the generating system.

12. The aircraft of claim 11, wherein the distribution system is configured to distribute electric power stored in the power storage device to a plurality of systems of the aircraft.

13. A propulsion system for an aircraft, the propulsion system having a variable airflow capture area and configured to be coupled in an aircraft structure of the aircraft, the propulsion system including:
at least one jet engine mounted to the aircraft structure;
at least one auxiliary thrust fan coupled in the aircraft structure, wherein
in a first mode,
the propulsion system has a first airflow capture area, the at least one jet engine provides power to the aircraft, and
the at least one auxiliary thrust fan is in a standby state, stowed within an aerodynamic profile of the aircraft structure; and
in a second mode,
the propulsion system has a second airflow capture area that is greater than the first airflow capture area, and
the at least one auxiliary thrust fan is in a deployed state and is driven by power extracted from the at least one jet engine, further wherein
an exhaust velocity of the at least one jet engine in the second mode is less than the exhaust velocity of the at least one jet engine in the first mode as power is extracted from the at least one jet engine to drive the at least one auxiliary thrust fan; and
a noise level output by the at least one jet engine in the second mode is less that the noise level output by the at least one jet engine in the first mode.

14. The propulsion system of claim 13, wherein
the first mode corresponds to a supersonic operation mode of the aircraft; and
the second mode corresponds to a low speed operation mode of the aircraft.

15. The propulsion system of claim 13, wherein the at least one auxiliary thrust fan is mechanically coupled to and driven by the at least one jet engine in the second mode.

16. The propulsion system of claim 13, wherein the at least one auxiliary thrust fan is electrically coupled to and driven by the at least one jet engine in the second mode.

17. The propulsion system of claim 13, wherein
the at least one jet engine comprises at least one low bypass ratio turbojet engine configured to generate thrust to support supersonic cruise operation of the aircraft; and
the at least one auxiliary thrust fan comprises a plurality of auxiliary thrust fans.

18. The propulsion system of claim 17, wherein
the first airflow capture area is defined by a capture area of the at least one low bypass ratio turbojet engine; and
the second airflow capture area is defined by an airflow capture area of the plurality of auxiliary thrust fans together with the capture area of the at least one low bypass ratio turbojet engine.

19. The propulsion system of claim 13, wherein the at least one auxiliary thrust fan comprises a plurality of auxiliary thrust fans arranged circumferentially along an aft end portion of a main body of the aircraft structure.

20. The propulsion system of claim 13, wherein the at least one auxiliary thrust fan comprises a plurality of auxiliary thrust fans arranged circumferentially along a forward end portion of a main body of the aircraft structure.

21. The propulsion system of claim 13, wherein the at least one auxiliary thrust fan comprises a first plurality of auxiliary thrust fans arranged along a leading edge portion of a first wing of the aircraft structure, and a second plurality of auxiliary thrust fans arranged along a leading edge portion of a second wing of the aircraft structure.

22. The propulsion system of claim 13, further comprising a drive system coupled between the at least one jet engine and the at least one auxiliary thrust fan, the drive system comprising:
a generating system operably coupled to the at least one jet engine, wherein the generating system is configured to generate electric power from power extracted during operation of the at least one jet engine; and
a distribution system configured to selectively distribute the electric power generated by the generating system to the at least one auxiliary thrust fan to drive the at least one auxiliary thrust fan during operation in the second mode.

23. The propulsion system of claim 22, wherein the drive system includes a power storage device configured to store electric power generated by the generating system.

24. The propulsion system of claim 23, wherein the distribution system is configured to distribute electric power stored in the power storage device to a plurality of systems of the aircraft.

25. A method of making a propulsion system for an aircraft, the propulsion system having a variable airflow capture area and being configured to be operably coupled in an aircraft structure of the aircraft, the method including:
mounting at least one jet engine to the aircraft structure;
coupling at least one auxiliary thrust fan in the aircraft structure, wherein
in a first mode,
the propulsion system has a first airflow capture area, the at least one jet engine is configured to provide power to the aircraft, and
the at least one auxiliary thrust fan is in a standby state, stowed within an aerodynamic profile of the aircraft structure; and
in a second mode,
the propulsion system has a second airflow capture area that is greater than the first airflow capture area, and
the at least one auxiliary thrust fan is in a deployed state and is driven by power extracted from the at least one jet engine, further wherein
an exhaust velocity of the at least one jet engine in the second mode is less than the exhaust velocity of the at least one jet engine in the first mode as power is extracted from the at least one jet engine to drive the at least one auxiliary thrust fan; and a noise level output by the at least one jet engine in the second mode is less than the noise level output by the at least one jet engine in the first mode.

26. The method of claim 25, wherein
the first mode corresponds to a supersonic operation mode of the aircraft; and
the second mode corresponds to a low speed operation mode of the aircraft.

27. The method of claim 25, wherein the at least one auxiliary thrust fan is mechanically coupled to and driven by the at least one jet engine in the second mode.

28. The method of claim 25, wherein the at least one auxiliary thrust fan is electrically coupled to and driven by the at least one jet engine in the second mode.

29. The method of claim 25, wherein
the at least one jet engine comprises at least one low bypass ratio turbojet engine configured to generate thrust to support supersonic cruise operation of the aircraft; and
the at least one auxiliary thrust fan comprises a plurality of auxiliary thrust fans.

30. The method of claim 29, wherein
the first airflow capture area is defined by a capture area of the at least one low bypass ratio turbojet engine; and
the second airflow capture area is defined by an airflow capture area of the plurality of auxiliary thrust fans together with the capture area of the at least one low bypass ratio turbojet engine.

31. The method of claim 25, wherein the at least one auxiliary thrust fan comprises a plurality of auxiliary thrust fans arranged circumferentially along an aft end portion of a main body of the aircraft structure.

32. The method of claim 25, wherein the at least one auxiliary thrust fan comprises a plurality of auxiliary thrust fans arranged circumferentially along a forward end portion of a main body of the aircraft structure.

33. The method of claim 25, wherein the at least one auxiliary thrust fan comprises a first plurality of auxiliary thrust fans arranged along a leading edge portion of a first wing of the aircraft structure, and a second plurality of auxiliary thrust fans arranged along a leading edge portion of a second wing of the aircraft structure.

34. The method of claim 25, further comprising a drive system coupled between the at least one jet engine and the at least one auxiliary thrust fan, the drive system comprising:
a generating system operably coupled to the at least one jet engine, wherein the generating system is configured to generate electric power from power extracted during operation of the at least one jet engine; and
a distribution system configured to selectively distribute the electric power generated by the generating system to the at least one auxiliary thrust fan to drive the at least one auxiliary thrust fan during operation in the second mode.

35. The method of claim 34, wherein the drive system includes a power storage device configured to store electric power generated by the generating system.

36. The method of claim 35, wherein the distribution system is configured to distribute electric power stored in the power storage device to a plurality of systems of the aircraft.

\* \* \* \* \*